(12) United States Patent
Kwon et al.

(10) Patent No.: US 10,237,899 B2
(45) Date of Patent: Mar. 19, 2019

(54) WIRELESS TERMINAL AND INSTRUCTION PROCESSING METHOD THEREOF

(71) Applicant: Samsung Electronics Co., Ltd, Gyeonggi-do (KR)

(72) Inventors: Taeho Kwon, Gyeonggi-do (KR);
Jinwoo Jeon, Gyeonggi-do (KR);
Youngbin Cho, Gyeonggi-do (KR);
Pyeonggyu Jin, Gyeonggi-do (KR);
Minwoan Choi, Gyeonggi-do (KR);
Gajin Song, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 15/338,303

(22) Filed: Oct. 28, 2016

(65) Prior Publication Data

US 2017/0127457 A1    May 4, 2017

(30) Foreign Application Priority Data

Oct. 29, 2015   (KR) .................. 10-2015-0151080
Feb. 17, 2016   (KR) .................. 10-2016-0018669

(51) Int. Cl.
*H04W 4/00*      (2018.01)
*H04W 76/10*    (2018.01)
(Continued)

(52) U.S. Cl.
CPC ......... *H04W 76/10* (2018.02); *H04L 63/0492* (2013.01); *H04L 63/101* (2013.01);
(Continued)

(58) Field of Classification Search
CPC ..... H04W 76/10; H04W 76/02; H04W 88/02; H04W 12/02; H04W 12/08; H04W 4/80;
(Continued)

(56) References Cited

U.S. PATENT DOCUMENTS

2004/0239482 A1* 12/2004 Fitzgibbon ............. G08C 17/00
                                                                                340/5.61
2009/0130951 A1*  5/2009 Missler .................. A63H 18/12
                                                                                446/444

(Continued)

FOREIGN PATENT DOCUMENTS

EP          2892199 A1    7/2015
JP       2015085899 A    5/2015
(Continued)

OTHER PUBLICATIONS

Andrew Smith, et al., "From Carjacking to Carhacking: Computerised Vehicles are More Vulnerable Than Ever", Jan. 26, 2015, http://theconversation.com/from-carjacking-to-carhacking-computerised-vehicles-are-more-vulnerable-than-ever-36716 cited in http://theconversation.com/au, 3 pages.

(Continued)

*Primary Examiner* — Sai Ming Chan

(57) ABSTRACT

A command processing method of a wireless terminal configured to communicate with a transportation means and a mobile terminal. The command data processing method includes receiving command data destined for the transportation means from the mobile terminal and checking an operation status of the transportation means. The method also includes determining whether to deliver the command data to the transportation means based on the operation status of the transportation means and information on the command data and delivering, when the command data is determined to be delivered to the transportation means, the command data to the transportation means.

23 Claims, 25 Drawing Sheets

(51) Int. Cl.
*H04L 29/08* (2006.01)
*H04L 29/06* (2006.01)
*H04W 12/02* (2009.01)
*H04W 12/08* (2009.01)
*H04W 4/80* (2018.01)
*H04W 88/02* (2009.01)
*B60R 25/24* (2013.01)

(52) U.S. Cl.
CPC ............... *H04L 67/34* (2013.01); *H04W 4/80* (2018.02); *H04W 12/02* (2013.01); *H04W 12/08* (2013.01); *B60R 25/24* (2013.01); *H04W 88/02* (2013.01)

(58) Field of Classification Search
CPC ..... H04L 67/34; H04L 67/23; H04L 63/0452; H04L 63/101
USPC .......................................................... 370/329
See application file for complete search history.

(56) References Cited

U.S. PATENT DOCUMENTS

2009/0164074 A1* 6/2009 Cui ..................... B60K 25/06
701/51

2012/0254960 A1  10/2012  Lortz et al.
2013/0273847 A1  10/2013  Le et al.
2014/0195100 A1   7/2014  Lundsgaard et al.
2015/0191135 A1   7/2015  Ben Noon et al.
2016/0272154 A1   9/2016  Sanji et al.

FOREIGN PATENT DOCUMENTS

KR         101031490 B1    4/2011
KR        20130128765 A   11/2013
KR        20140023065 A    2/2014

OTHER PUBLICATIONS

Foreign Communication From a Related Counterpart Application, PCT Application No. PCT/KR2016/012278, International Search Report dated Feb. 3, 2017, 3 pages.

Communication from a foreign patent office in a counterpart foreign application, European Patent Office, "Supplementary European Search Report," Application No. EP16860295.1, Apr. 20, 2018, 9 pages.

* cited by examiner

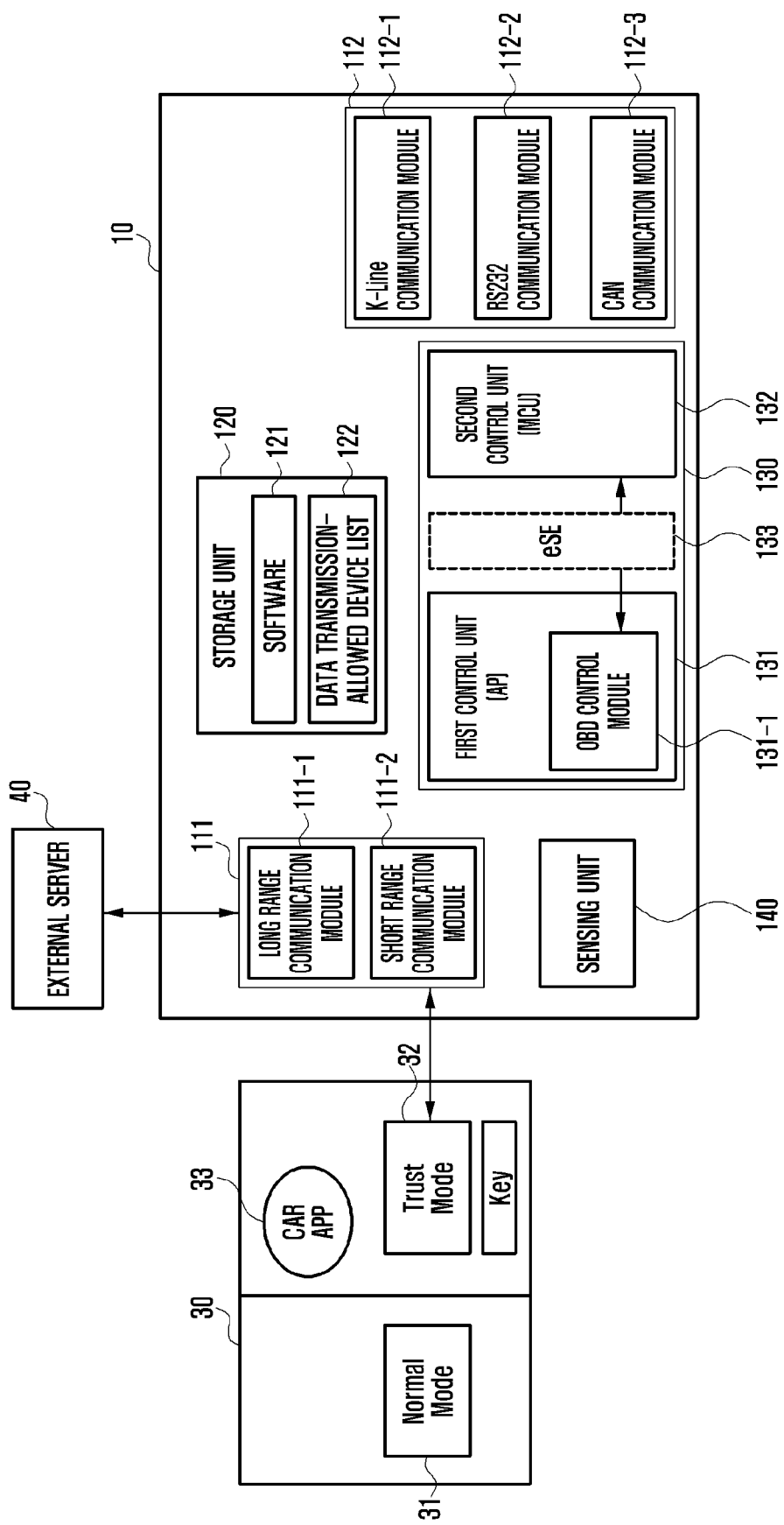

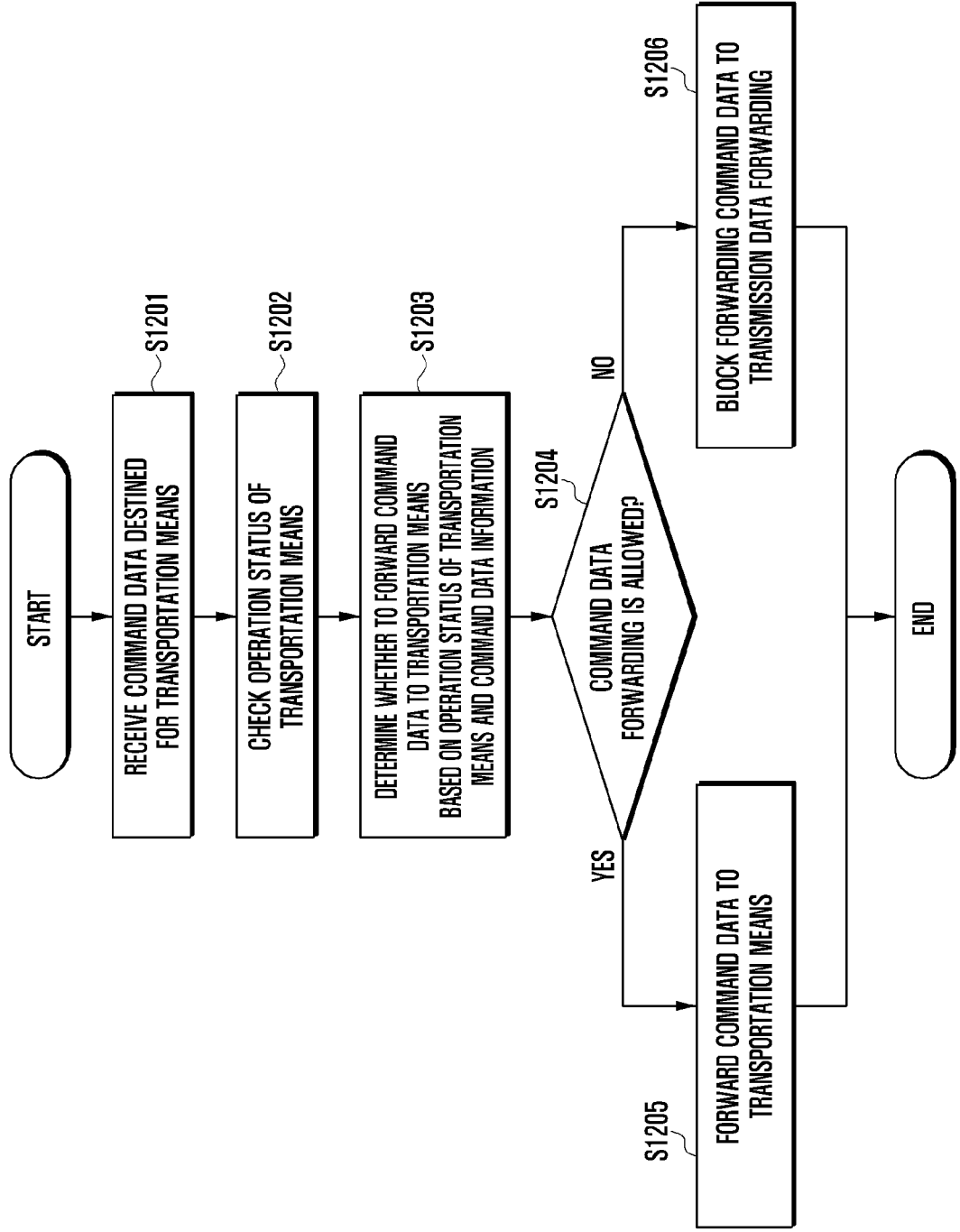

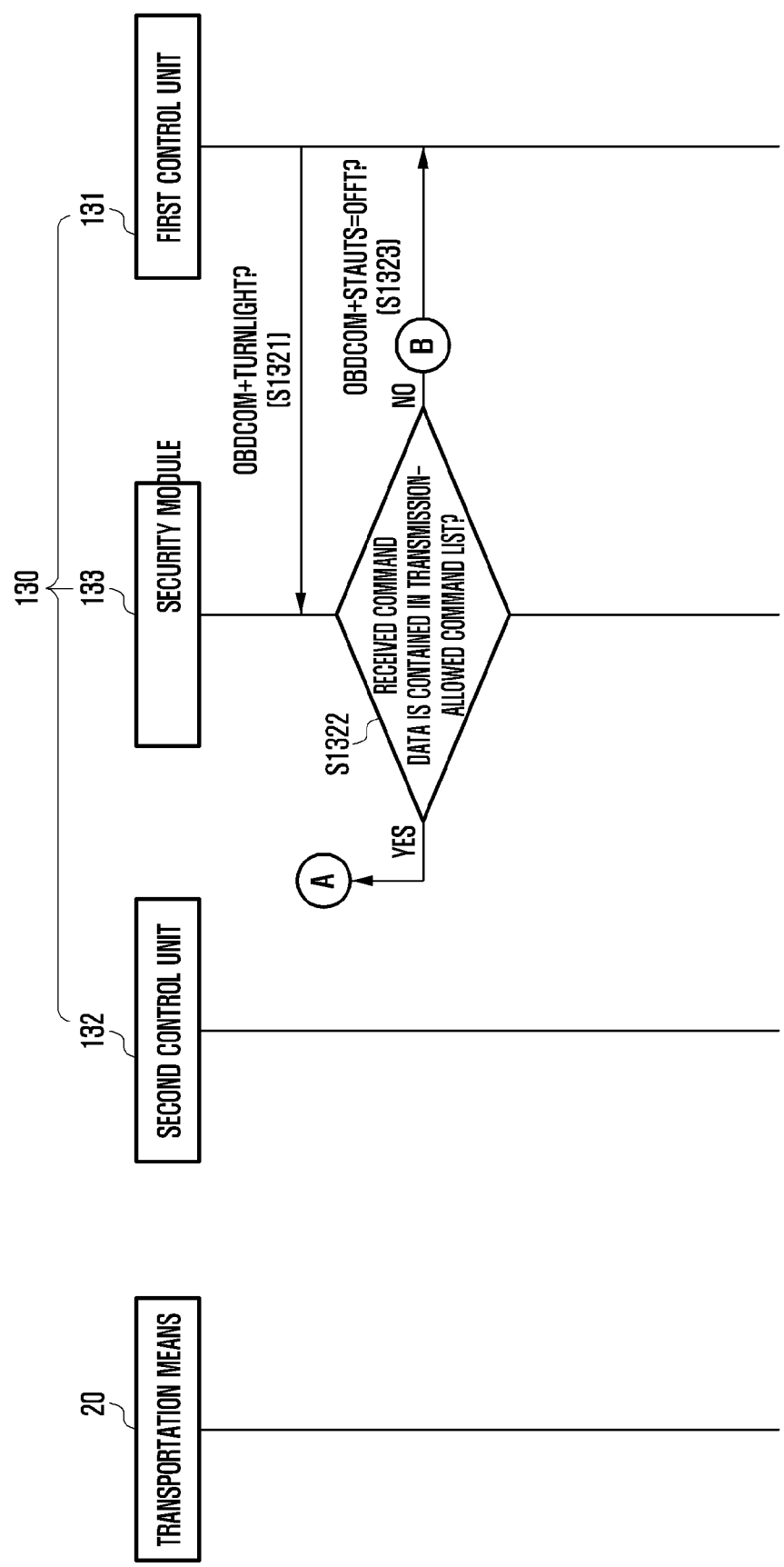

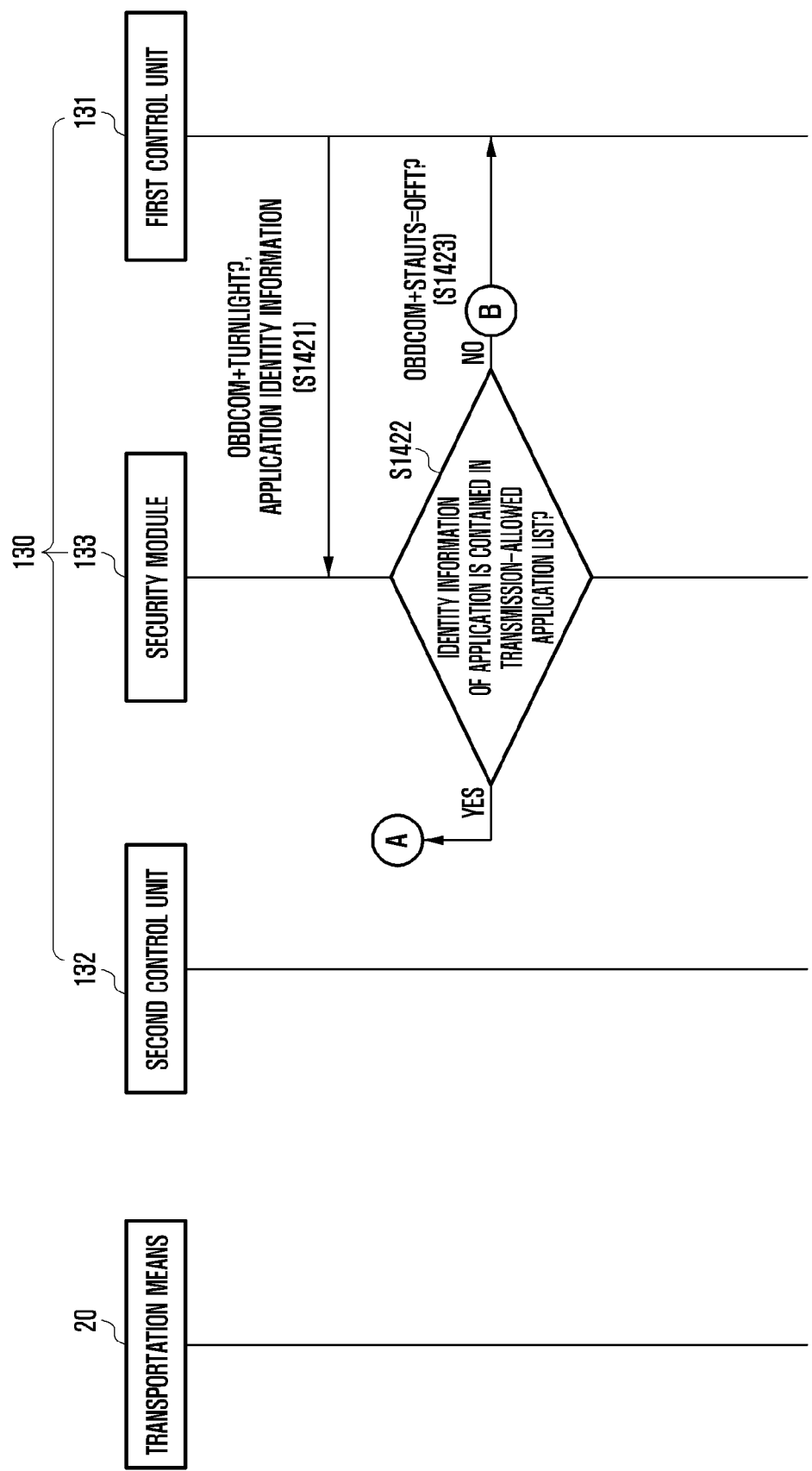

WIRELESS TERMINAL AND INSTRUCTION PROCESSING METHOD THEREOF

CROSS-REFERENCE TO RELATED APPLICATION(S) AND CLAIM OF PRIORITY

The present application is related to and claims priority under 35 U.S.C. 119(a) to applications filed in the Korean Intellectual Property Office on Oct. 29, 2015 and Feb. 17, 2016, and assigned Serial Nos. 10-2015-0151080 and 10-2016-0018669, respectively, the contents of which are incorporated herein by reference.

TECHNICAL FIELD

The present disclosure relates to a method for a wireless terminal capable of communicating with a transportation means and a mobile terminal to process command data transmitted from the mobile terminal to the transportation means and a wireless terminal processing command data.

BACKGROUND

On-Board Diagnostics (OBD) is a term referring to a vehicle's self-diagnostic system that is capable of warning that a driver should undertake vehicle inspection by blinking a Malfunction Indication Lamp (MIL) whenever a problem is detected.

The OBD is categorized into two categories: OBD I and OBD II. The OBD I takes charge of diagnosis for detecting breakage/short-circuit of various sensors connected to an Engine Control Module (ECM), and the OBD II takes charge of diagnosis for rationality and performance of sensors, with the exception of breakage/short-circuit, and normal system operation.

Typically, the OBD is mounted on a dashboard of a vehicle. The OBD may also be mounted at a lower part of one side of the vehicle near the driver.

The OBD mounted to a vehicle is useful because it diagnoses the vehicle and provides a car repair shop or a car insurance company with the result of the diagnosis. Also, the driver may correct a bad driving habit and ensure driving safety based on the feedback information about the driver's driving habits collected and analyzed by the OBD.

The OBD may acquire vehicle status information from the ECM of the vehicle. For example, the OBD may monitor the vehicle to acquire the information on the vehicle by means of a plurality of sensors mounted to the vehicle. In this case, the OBD may acquire the vehicle status information (such as gasoline mileage, revolutions per minute (RPM), and velocity of the vehicle) from the ECM.

SUMMARY

In the case that the OBD is equipped with a radio communication module, it may operate as a wireless terminal.

If the OBD is equipped with a radio communication module, a mobile terminal may collect status information of the transportation means (e.g., vehicle) from the OBD and control the transportation means based thereon.

However, such a configuration may pose a risk in that a third party (e.g., hacker or attacker) may install a malicious application (e.g., virus program and malicious software) in the mobile terminal owned by the legal user (e.g., driver and passenger) to control the transportation means remotely for illegal purposes.

It may also be possible that a third party may install a malicious application in the OBD through a mobile terminal to control the transport means for illegal purposes.

In the case that the radio communication module supports remote communication, a third party may control the transportation means outside the transportation means by transmitting wrong or forged command data.

In this case, the safety of passengers (e.g., driver and fellow passenger) may be threatened significantly.

There is therefore a need of a method for allowing the wireless terminal of the OBD to transmit the command data destined for the transportation means selectively.

To address the above-discussed deficiencies, it is a primary object to provide a command data processing method of a radio communication terminal capable of communicating with a transportation means and a mobile terminal is provided. The command data processing method includes receiving command data destined for the transportation means from the mobile terminal; checking an operation status of the transportation means; determining whether to deliver the command data to the transportation means based on the operation status of the transportation means and information on the command data; and delivering, when the command data is determined to be delivered to the transportation means, the command data to the transportation means.

Preferably, the command data processing method further includes blocking, when the command data is determined not to be delivered to the transportation means, delivery of the command data to the transportation means.

Preferably, the command data is received from the mobile terminal using a wireless communication protocol and transmitted to the transportation means using a wired communication protocol.

Preferably, whether to deliver the command data to the transportation means is determined based on a communication protocol used for receiving the command data.

Preferably, determining whether to deliver the command data to the transportation means includes determining, when the command data is received using a short range communication protocol, to deliver the command data to the transportation means and determining, when the command data is received using a long range communication protocol, to block delivery of the command data to the transportation means.

Preferably, whether to deliver the command data to the transportation means is determined based on the type of the command data.

Preferably, determining whether to deliver the command data to the transportation means includes determining, when the type of the command data is inquiry command data for inquiring about the operation status of the transportation means, to deliver the command data to the transportation means and determining, when the type of the command data is control command data for controlling the transportation means, not to deliver the command data to the transportation means.

Preferably, whether to deliver the command data to the transportation means is determined based on an operation mode of the mobile terminal transmitting the command data.

Preferably, whether to deliver the command data to the transportation means is determined based on whether identity information of the mobile terminal transmitting the command data is previously registered with the radio communication terminal.

In accordance with an aspect of the present disclosure, a command data processing method of a radio communication terminal capable of communicating with a transportation means and a mobile terminal is provided. The command data processing method includes receiving command data destined for the transportation means from the mobile terminal and forwarding the command data to the transportation means selectively based on an operation status of the transportation means and information on the command data.

In accordance with an aspect of the present disclosure, a radio communication terminal capable of communicating with a transportation means and a mobile terminal is provided. The radio communication terminal includes a communication unit for receiving command data destined for the transportation means from the mobile terminal and a control unit which checks an operation status of the transportation means; determines whether to deliver the command data to the transportation means based on the operation status of the transportation means and information on the command data; and controls, when the command data is determined to be delivered to the transportation means, the communication unit to transmit the command data to the transportation means.

Preferably, the control unit includes a first control unit which determines whether to deliver the command data and a second control unit which converts the command data to a format recognizable by the transportation means.

Preferably, the first control unit blocks, when the command data is determined not to be delivered to the transportation means, transmitting the command data to the second control unit.

Preferably, the communication unit includes a first communication unit which receives the command data destined for the transportation means from the mobile terminal using a wireless communication protocol and a second communication unit which transmits the command data to the transportation means using a wired communication protocol.

Preferably, the control unit determines whether to deliver the command data to the transportation means based on the communication protocol used for receiving the command data.

Preferably, the control unit determines to deliver, when the command data is received using a short range communication protocol, the command data to the transportation means and to block, when the command data is received using a long range communication protocol, delivery of the command data to the transportation means.

Preferably, the control unit determines whether to deliver the command data to the transportation means based on the type of the command data.

Preferably, the control unit determines to deliver, when the type of the command data is inquiry command data for inquiring about the operation status of the transportation means, the command data to the transportation means and to block, when the type of the command data is control command data for controlling the transportation means, delivery of the command data to the transportation means.

Preferably, the control unit determines whether to deliver the command data to the transportation means based on an operation mode of the mobile terminal transmitting the command data.

Preferably, the control unit determines whether to deliver the command data to the transportation means based on whether identity information of the mobile terminal is registered with the radio communication terminal.

The other effects may be explicitly or implicitly disclosed in the description of the embodiments of the present disclosure. That is, various effects expected from the present disclosure will become clear in the following description of the embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2B illustrates a configuration of the radio communication terminal of FIG. 1 for communication with a mobile terminal and a server;

FIG. 12 illustrates a flowchart of a command data processing method of a radio communication terminal for processing command data destined for a transportation means according to another embodiment of the present disclosure;

FIGS. 13A to 13C illustrate a procedure for a radio communication terminal to handle command data transmitted to a transportation means;

FIGS. 14A to 14C illustrate a procedure for a radio communication terminal to handle command data transmitted to a transportation means;

DETAILED DESCRIPTION

Figure 1:
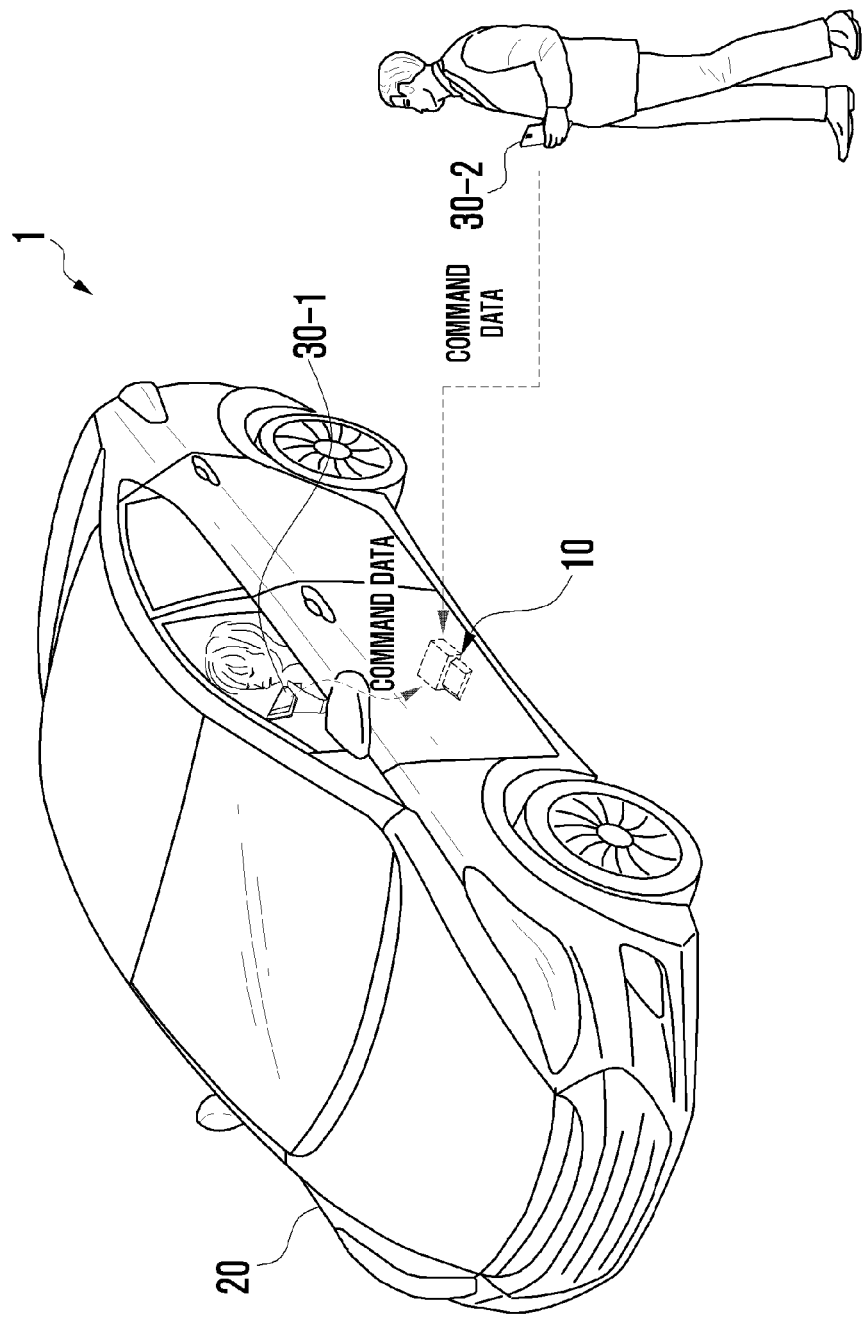
FIG. 1 illustrates a system of processing an instruction generated by a mobile terminal for controlling a transportation means according to an embodiment of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Hereinafter, various embodiments of the present specification will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

FIG. 1 illustrates a system of processing an instruction generated by a mobile terminal for controlling a transportation means according to an embodiment of the present disclosure.

In reference to FIG. 1, the system 1 includes a transportation means 20, a radio communication terminal 10 mounted in the transportation means 20, and a plurality of mobile terminals 30-1 and 30-2.

In FIG. 1, the radio communication terminal 10 may communicate with the transportation means 20 to collect status information of the transportation means 20 and control functions of the transportation means. Examples of the inbuilt communication terminal 10 may include an On-Board Diagnostics (OBD), a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical device, a camera, and a wearable device.

Although the present disclosure is made with the example of an OBD as the radio communication terminal 10, the radio communication terminal is not limited thereto.

The OBD may collect status information of the transportation means 20. The status information may include travel information (such as velocity, travel time, revolution per minute (RPM), travel distance, average mileage, and instant mileage of the transportation means 20 (e.g., vehicle), engine status information (such as coolant temperature, intake air temperature, intake air amount, engine oil temperature, transmission oil temperature, fuel injection amount, oxygen sensor voltage, ignition angle, carbon emission amount, and air/fuel ratio-learning amount), brake status information, battery voltage information, and air conditioner refrigerant pressure information.

If any problem occurs in the transportation means 20, the problem may be checked based on the information collected by the OBD. The configuration of the radio communication terminal 10 is described later in detail with reference to FIGS. 2A and 2B.

The transportation means 20 may be a vehicle carrying passengers or load. The transportation means 20 may be operating under the control of a person or a device (e.g., artificial intelligence electronic device and automatic navigation device) configured to control the transportation means 20. Examples of the transportation means 20 may include a vehicle, a plane, a motorcycle, a ship, and a train.

The embodiment of FIG. 1 is directed to a vehicle as an example of the transportation means 20. The vehicle 20 may be equipped with an electronic control system (not shown) for controlling various functions concerning the travel of the vehicle 20. Here, the electronic control system may include the radio communication terminal 10 for supporting remote control of the vehicle (such as exhaust gas control, engine control, light control, and brush control). The electronic control system may include a connector (e.g., OBD node and BD connector) for connection with the radio communication terminal 10. The connector may be implemented in the form of matching the connector of the radio communication terminal 10.

In FIG. 1, each of the mobile terminals 30-1 and 30-2 may be a device capable of transmitting and receiving data to and from the radio communication terminal 10 of the transportation means 20.

Examples of the mobile terminals 30-1 and 30-2 may include a portable terminal, a smartphone, a tablet PC, a mobile phone, a video phone, an e-book reader, a desktop PC, a laptop PC, a netbook computer, a PDA, a PMP, an MP3 player, a mobile medical device, a camera, an Internet of Things (IoT) device, a server, a cloud server, and a wearable device.

Each of the mobile terminals 30-1 and 30-2 may be located inside or outside the transportation means 20. In FIG. 1, the mobile terminal 30-1 is carried by the driver seated inside the transportation means 20, and the mobile terminal 30-2 is carried by a third party staying outside the transportation means 20.

In FIG. 1, the radio communication terminal 10 may receive command data concerning the transportation means 20 from each of the mobile terminal 30-1 and 30-2 via a first network.

The first network may be a communication network using a wireless communication protocol. The wireless communication protocol is described later in detail with reference to FIG. 2A.

The command data may be categorized into two categories: generic command data and enhanced command data. The generic command data may be command data complying with the OBD-2 standard. The enhanced command data may be command data complying with a format specified per manufacturer of the radio communication terminal 10 or per type of the transportation means 20.

The command data may be categorized into another two categories: control command data and inquiry command data. The control command data is command data for controlling the transportation means 20 and may include write command data and actuation command data. The inquiry command data is command data for inquiring about status information of the transportation means 20 and may include read command data.

In detail, the control command data may include command data for locking or unlocking doors of the transportation means 20, command data for locking or unlocking widows of the transportation means 20, command data for turning on or off a hazard lamp of the transportation means 20, command data for turning on or off a right or left lamp of the transportation means 20, command data for honking a horn of the transportation means 20, command data for opening or closing a trunk lid of the transportation means 20, command data for actuating a brake of the transportation means 20, and command data for actuating an acceleration pedal of the transportation means 20.

The inquiry command data may include command data for inquiring about a number of key codes of the transportation means 20, command data for inquiring about engine oil amount of the transportation means 20, command data inquiring about whether seat belts of the transportation means 20 are fastened, command data inquiring about battery life or residual battery capacity of the transportation means 20, command data inquiring about light status of lamps of the transportation means 20, command data inquiring about gear status of the transportation means 20, command data for inquiring about a driving wheel angle of the transportation means 20, command data inquiring about brake status of the transportation means 20, command data inquiring about velocity of the transportation means 20, and command data inquiring about engine RPM of the transportation means 20.

If command data is received, the radio communication terminal 10 may check the operation status of the transportation means 20. The radio communication terminal 10 may also check the operation status of the transportation means 20 and store the information on the previously checked operation status before the receipt of the command data. For example, the radio communication terminal 10 may acquire the status information of the transportation means 20 and determine the operation status of the transportation means 20 based on the status information. For example, the radio communication terminal 10 may acquire the information on the velocity of the transportation means 20 as the status information of the transportation means 20 and, if the velocity of the transportation means 20 is equal to or greater than a predetermined value, determine the operation status of the transportation means 20 as "driving" status.

In the case that the transportation means 20 is a vehicle, the operation status of the transportation means 20 may be one of "driving", "parking", and "stopping".

Next, the radio communication terminal 10 may determine whether command data is to be transmitted to the transportation means 20 based on the determined operation status and the received command data. For example, if it is determined that the command data destined for the transportation means 20 threatens the safety of the passengers or cargo of the transportation means 20 in its current operation status, the radio communication terminal 10 may determine not to forward the received command data to the transportation means 20. Otherwise if it is determined that the command data destined for the transportation means 20 has little or no possibility of threatening the safety of the passengers or cargo of the transportation means 20 in its current status, the radio communication terminal 10 may determine to forward the received command data to the transportation means 20.

For example, if the operation status of the transportation means 20 is "driving" and the received command data is control command data, the radio communication terminal 10 may determine not to forward the command data to the transportation means 20. In this case, the control command data may be command data for actuating the brake of the transportation means 20 or the acceleration pedal.

If the operation status of the transportation means 20 is "driving" and the received command data is inquire command data for inquiring about status information of the transportation means 20, the radio communication terminal 10 may determine to forward the command data to the transportation means 20. In this case, the inquire command data may be command data for inquiring about the velocity or the engine RPM of the transportation means 20.

If it is determined to forward the command data to the transportation means 20, the radio communication terminal 10 may transmit the command data to the transportation means 20 via a second network.

The second network may be a network using a wired communication protocol. The wired communication protocol is described later in detail with reference to FIG. 2A.

Upon receipt of the command data, the transport means 20 may operate according to the receive command data. In the case that the received command data is inquire command data, the transportation means 20 may collect the status information of the transportation means 20 according to the inquiry command data. The transportation means 20 may transmit the collected status information to the radio communication terminal 10.

Figure 2A:
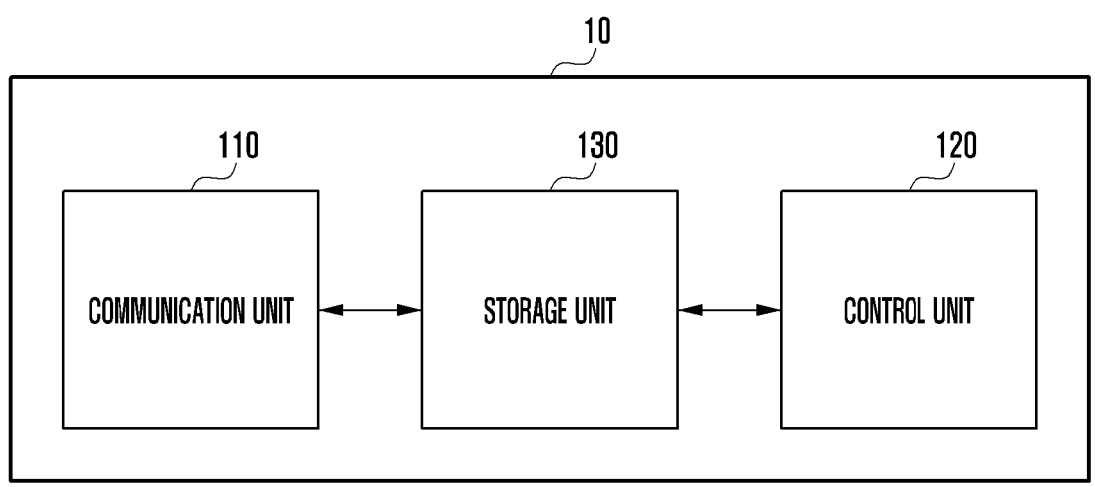
FIG. 2A illustrates a configuration of the radio communication terminal of FIG. 1.

FIG. 2A illustrates a configuration of the radio communication terminal of FIG. 1.

In reference to FIG. 2A, the radio communication terminal 10 may include a communication unit 110, a storage unit 120 (or memory), and a control unit 130 (or processor).

The communication unit 110 may communicate with at least one of the mobile terminals 30-1 and 30-2 and the transportation means 20 using a wired or wireless communication protocol.

For example, the communication unit 110 may communicate with any of the mobile terminals 30-1 and 30-2 using a wireless communication protocol. The communication unit 110 may also communicate with the transportation means 20 using a wired communication protocol.

In the case of using a wireless communication protocol, the communication unit 110 may perform communication using one of Wireless Fidelity (Wi-Fi), Bluetooth, and Near Field Communication (NFC). In this case, the communication unit 110 may transmit/receive communication establishment information such as a Service Set Identifier (SSID) and a session key and establish a communication link (e.g., communication channel) using the communication establishment information to transmit and receive various information. The communication unit 110 may perform communication using various communication standards such as an Institute of Electrical and Electronics Engineers (IEEE) standard, a Zigbee standard, a $3^{rd}$ Generation (3G) mobile communication standard, a $3^{rd}$ Generation Partnership Project (3 GPP) standard, a Long Term Evolution (LTE) standard, and a Global Positioning System (GPS) standard.

In the case of using a wired communication protocol, the communication unit 110 may use one of a 20-pin connector, 16-pin connector, and a USB connector. The communication unit 110 may perform communication using various communication standards such as On-Board Diagnosis Version I (OBD-1), OBD-2, European On-Board Diagnosis (EOBD), Korean On-Board Diagnosis (KOBD), K-Line, RS-232, and Controller Area Network (CAN).

In the present disclosure, the communication unit 110 may receive command data concerning the transportation means 20 from one of the mobile terminals 30-1 and 30-2 and transfer it to the control unit 130.

The communication unit 110 may also receive the status information of one of the mobile terminals 30-1 and 30-2 and transfer it to the control unit 130.

The communication unit 110 may also receive command data destined for the transportation means 20 and forward it to the transportation means 20.

The storage unit 120 may include at least one of non-volatile and volatile memories for storing various programs and data executed and processed by the radio communication terminal 10. Examples of the non-volatile memory may include a Read Only Memory (ROM) and a flash memory, and examples of the volatile memory may include a Random Access Memory (RAM). The storage unit 120 may also include a memory card (not shown) such as a micro SD card and memory stick attachable to the radio communication terminal 10.

The control unit 130 may control overall operations of the radio communication terminal 10.

According to an embodiment of the present disclosure, the control unit 130 may determine the operation status of the transportation means 20 based on the status information of the transportation means 20. If the operation status of the transportation means 20 is determined, the control unit 130 may determine whether to forward the command data to the transportation means 20 based on the command data received from the communication unit 110 and the determined operation status.

For example, the control unit 130 may determine whether to forward the command data to the transportation means 20 based on the communication protocol used for receiving the instruction. For example, the control unit 130 may determine to forward the command data to the transportation means 20 when the communication protocol used for receiving the command data is a short range communication protocol, and it may determine not to forward the command data to the transportation means 20 when the communication protocol used for receiving the command data is a long range communication protocol.

According to an embodiment, the control unit 130 may determine whether to forward the command data to the transportation means 20 based on the type of the command data. For example, the control unit 130 may determine to forward the command data to the transportation means 20 when the command data is inquiry command data for inquiring about the operation status of the transportation means 20, and it may determine not to forward the command data to the transportation means 20 when the command data is control command data for controlling the transportation means.

According to an embodiment of the present disclosure, the control unit 130 may determine whether to forward the command data to the transportation means 20 based on the operation mode of the mobile terminal 30-1 (or 30-2) transmitting the command data. For example, the control unit 130 may determine to forward the command data to the transportation means 20 when the mobile terminal 30-1 (or 30-2) is operating in a trust mode, and it may determine not to forward the command data to the transportation means 20 when the mobile terminal 30-1 (or 30-2) is operating in a normal mode.

According to an embodiment of the present disclosure, the control unit 130 may determine whether to forward the command data to the transportation means 20 based on the identity information of the mobile terminal 30-1 (or 30-2). For example, the control unit 130 may determine to forward the command data to the transportation means 20 when the identity information of the mobile terminal is registered identity information, and it may determine not to forward the command data to the transportation means 20 when the identity information of the mobile terminal 30-1 (or 30-2) is not registered identify information.

FIG. 2B illustrates a configuration of the radio communication terminal of FIG. 1 for communication with a mobile terminal and a server.

In reference to FIG. 2B, the radio communication terminal 10 may include a communication unit 110 with two communication module sets 111 and 112, a storage unit 120, a control unit 130, and a sensing unit 140. The control unit 130 may include a first control unit 131 and a second control unit 132. The radio communication terminal 10 may further include an audio processing unit (not shown) having a microphone and a speaker, a touch pad (not shown) for receiving touch-based input, an input unit (not shown) for supporting physical key input, a display unit (not shown) for displaying an operation screen of the radio communication terminal 10, a light emission unit (not shown) with Light Emitting Diodes (LED), and a battery (not shown) for supplying power to the aforementioned components.

The communication unit 110 may perform communication with a mobile terminal 30, an external server 40, and the transportation means 20 using wired or wireless communication protocols.

The communication unit 110 may include a first communication unit 111 and a second communication unit 112. The first and second communication units 111 and 112 may be grouped depending on the communication purpose, function, and configuration. According to an embodiment of the present disclosure, the first communication unit 111 may be comprised of communication modules for communication with the mobile terminal 30 and/or the external server 40, and the second communication unit 112 may be comprised of communication modules for communication with the transportation means 20. According to an embodiment of the present disclosure, the first communication unit 111 may be comprised of wireless communication modules, and the second communication unit 112 may be comprised of wired communication modules.

The first communication unit 111 may be capable of communicating with at least one of the mobile terminal 30 and the external server 40 using a wireless communication protocol. The first communication unit 111 may include a long range communication module 111-1 and a short range communication module 111-2.

The radio communication terminal 10 may be capable of communicating with the external server 40 using the long range communication module 111-1. The long range communication module 111-1 may operate in compliance with a communication standard such as an IEEE standard, a 3G mobile communication standard, a 3GPP standard, an LTE standard, and a GPS standard.

The radio communication terminal 10 may be capable of communicating with the mobile terminal 30 using the short range communication module 111-2. The short range communication module 111-2 may operate in compliance with a communication standard such as Wi-Fi, Bluetooth, and NFC.

The second communication unit 112 may be capable of communication with the transportation means 20 using a wired communication protocol. The second communication unit 112 may include a K-Line communication module 112-1, an RS-232 communication module 112-2, and a CAN communication module 112-3. The second communication unit 112 may be capable of communicating with the transportation means 20 by means of at least one of the aforementioned communication modules using a wired communication protocol.

The sensing unit 140 may include various sensors for sensing the status of the radio communication terminal and the transportation means 20. For example, the sensing unit 140 may include at least one of an acceleration sensor, a gyro sensor, an illuminance sensor, a proximity sensor, a pressure sensor, a noise sensor (e.g., microphone), a video sensor (e.g., camera module), a temperature sensor, a shock sensor, and a timer.

The sensing unit 140 may sense at least one of residual battery capacity, temperature, velocity, shock, and acceleration of the transportation means 20 to generate a status value of the transportation means 20. The sensing unit 140 may also sense at least one of temperature, residual battery capacity, and operation status of the radio communication terminal 10 as the status information of the radio communication terminal 10.

The storage unit 120 may include at least one of non-volatile and volatile memories for storing software programs and data to be executed and processed in the radio communication terminal 10. Examples of the storage unit 120 are identical with those of the storage unit 120 of FIG. 2A.

According to an embodiment of the present disclosure, the storage unit 120 may store a data transmission-allowed device list 122. The data transmission-allowed device list 122 may include identity information of at least one mobile terminal 30 allowed to transmit command data to the transportation means 20. The data transmission-allowed device list 122 may be referred to as a white list.

According to an embodiment of the present disclosure, the storage unit 120 may store a data transmission-forbidden device list. The data transmission-forbidden device list may include identity information of at least one mobile terminal 30 forbidden from transmitting command data to the transportation means 20. For example, the identity information of the mobile terminal 30 owned by the user utilizing the transportation means 20 may be contained in the data transmission-allowed device list. In contrast, identity information of a mobile terminal owned by a third party may be contained in the data transmission-forbidden device list.

The control unit 130 may control overall operations of the radio communication terminal 10. The control unit 130 may include a first control unit 131 and a second control unit 132. The first and second control units 131 and 132 may control the operations of the radio communication terminal 10 and may be identified by purpose, function, and configuration.

The first control unit 131 may be an Application Processor (AP) (e.g., MSM8916 AP) for loading an Operating System (OS) (e.g., ANDROID® and TIZEN®) and executing application programs. The first control unit 131 may include an OBD control module 131-1 for communication with the second communication unit 112. The OBD control module 131-1 may be referred to as an OBD agent.

The second control unit 132 may be a Micro Controller Unit (MCU) (e.g., MCUs of OBD-1 and OBD-2) for onboard diagnosis of the transportation means 20. The second control unit 132 may convert the data formation of the command data received from the first control unit 131 to another format (e.g., CAN communication format and KWP2000 communication format) capable of being transmitted to the transportation means 20.

The first and second control units 131 and 132 may exchange data via a security module 133 interposed therebetween. The security module 133 may be an embedded Secure Element (eSE) module.

For example, the security module 133 may encrypt the inquiry command data generated by the first control unit 131 and transmit the encryption result to the second control unit 132. The security module 133 may also encrypt the status information of the transportation means 20 that is collected and transmitted by the second control unit 132 and transmit the encryption result to the first control unit 131 in response to the inquiry command data.

The security module is described later in detail with reference to FIG. 3C.

According to an embodiment of the present disclosure, the first control unit 131 may control the first communication unit 111 to receive the command data destined for the transportation means 20 from the mobile terminal 30. The first control unit 131 may determine whether to forward the command data to the transportation means 20 based on the command data. If it is determined that the command data is allowed to be forwarded, the first communication unit 111 may transfer the command data to the second control unit 132. If the command data is received, the second control unit 132 converts the format of the command data to another format capable of being transmitted to the transportation means 20. The second control unit 132 may control the second communication unit 112 to transmit the converted command data to the transportation means 20.

If it is determined that the command data is not allowed to be forwarded, the first control unit 131 may block transmission of the command data to the second control unit 132.

If an abnormal symptom is detected at the first control unit 131, the first control unit 131 may block transmission of the command data to the second control unit 132. For example, the first control unit 131 may execute a Real-time Kernel Protection (RKP) function in a Trust Zone to perform a Kernel event hooking process. Accordingly, the first control unit 131 may monitor the operating system, kernel, and applications of the first control unit 131 in real time. If an abnormal symptom (e.g., data forgery and third party hacking) is detected at one of them, the first control unit 131 may block transmission of the command data to the second control unit 132.

In FIG. 2B, the mobile terminal 30 may operate in multiple operation modes. For example, the mobile terminal 30 may operate in a normal mode 31 or a trust mode 32. The mobile terminal 30 may transmit command data to the radio communication terminal 10 in the normal mode 31 or the trust mode. The normal mode 31 and the trust mode 32 are described later in detail with reference to FIG. 6. The mobile terminal 30 may include a transportation means application 33 for controlling the transportation means 20. The mobile terminal 30 may transmit command data to the radio communication terminal 10 through the transportation means application 33.

Figure 2C:
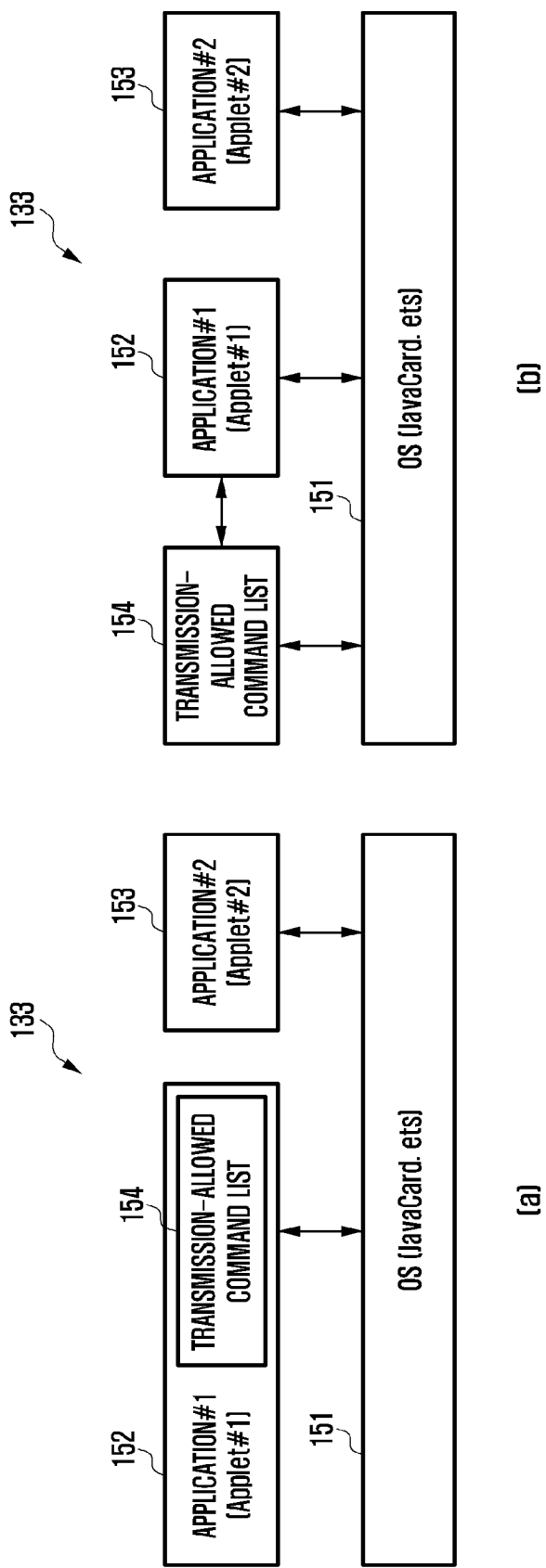
FIG. 2C illustrates configurations of the security module of FIG. 2B.

FIG. 2C illustrates configurations of the security module of FIG. 2B.

Referring to FIG. 2C, the security module 133 may include an Operating System (OS) 151 and various applications 152 and 153. For example, if the security module 133 uses a java platform, the OS 151 may be of "JAVAC-ARD®" suitable for an embedded device. The OS 151 may check the instructions and data used thereby to stay in a secure state.

The applications 152 and 153 may be applets programmed in JAVA® language. The applications 152 and 153 may be separated by a firewall and may request to the user who is installing a new application in the security module 133 for a separate authentication key.

According to an embodiment of the present disclosure, the security module 133 may use a secure core processor separated from the normal Application Processor (AP). The security module 133 may be physically separated from the first and second control units 131 and 132 so as to reinforce the secure state.

According to an embodiment of the present disclosure, the control unit 131 may forward the command data to the transportation means 20 via the security module 133.

In this case, the security module 133 may selectively transmit the received command data to the second control unit 132.

For example, the security module 133 may transmit the received command data to the second control unit 132 depending on the type of the command data.

For this purpose, the security module 133 may include a transmission-allowed command list 154. The transmission-allowed command list 154 may include at least one item of command data that the security module 133 can transmit to the second control unit 132.

The transmission-allowed command list 154 may be included in a certain applet 152 (e.g., application#1) as shown in part (a) of FIG. 2C or may be stored in the form of a file separated from the applet as shown in part (b) of FIG. 2C. In this case, the transmission-allowed command list formed as a separate file may be shared by a plurality of applets.

The transmission-allowed command list 154 may include at least one item of inquiry command data. As described above, the inquiry command data may be command data inquiring about the status information of the transportation means 20.

The transmission-allowed command list 154 may include at least one item of control command data for securing a user's security. The control command data may be command data for turning on the light or emergency lamp, actuating the brake of the transportation means 20, or locking the doors or windows of the transportation means 20.

If the command data received from the first control unit 131 is contained in the transmission-allowed command list 154, the security module 133 may transmit the command data to the second control unit 132. The second control unit 132 may forward the command data to the transportation means 20.

If the command data received from the first control unit 131 is not contained in the transmission-allowed command list 154, the security module 133 may not transmit the command data to the second control unit 132. In this way, it is possible to block the transmission of the command data to the transportation means 20.

According to an embodiment of the present disclosure, the security module 133 may selectively transmit the command data to the second control unit 132 based on the type of the command data and the identity information of the application that has requested for execution of the command data. In this case, the application may be an application installed in the mobile terminal 30.

The security module 133 may store a transmission-allowed application list (not shown). The transmission-allowed application list may include identity information of at least one application allowed for transmission of command data to the transportation means 20.

The transmission-allowed application list may be included in a certain applet or stored in the form of a file like the transmission-allowed command list that is separated from the applet.

If the transmission-allowed application list includes the identity information of the application that is received from the first control unit 131, the security module 133 may forward the command data to the transportation means 20.

If the transmission-allowed application list does not include the identity information of the application that is received from the first control unit 131, the security module 133 may not forward the command data to the transportation means 20. In this way, it is possible to block the transmission of the command data destined for the transportation means 20.

According to an embodiment of the present disclosure, at least one of the transmission-allowed command list and transmission-allowed application list may be stored in the security module 133 in various manners.

For example, at least one of the transmission-allowed command list and transmission-allowed application list may be stored in the security module at the manufacturing stage of the radio communication terminal 10 or included in a binary code of the radio communication terminal 10. At least one of the transmission-allowed command list and transmission-allowed application list may be provided by the external server 40 or stored by means of an application of the mobile terminal 30 or an external tool kit.

According to an embodiment of the present disclosure, instead of the transmission-allowed command list 154, the security module 133 may include a transmission-forbidden instruction list (not shown) including at least one item of command data forbidden from being transmitted to the second control unit 132. Instead of the transmission-allowed application list, the security module 133 may also include a transmission-forbidden application list including identity information of at least one application that is forbidden from transmitting command data to the second control unit 132.

Descriptions are made later in detail with reference to FIGS. 13A to 13C, 14A to 14C, 15A to 15C, and 16 of the procedures for transmitting command data from the first control unit 131 to the transportation means 20 via the security module 133 according to various embodiments of the present disclosure.

Figure 3:
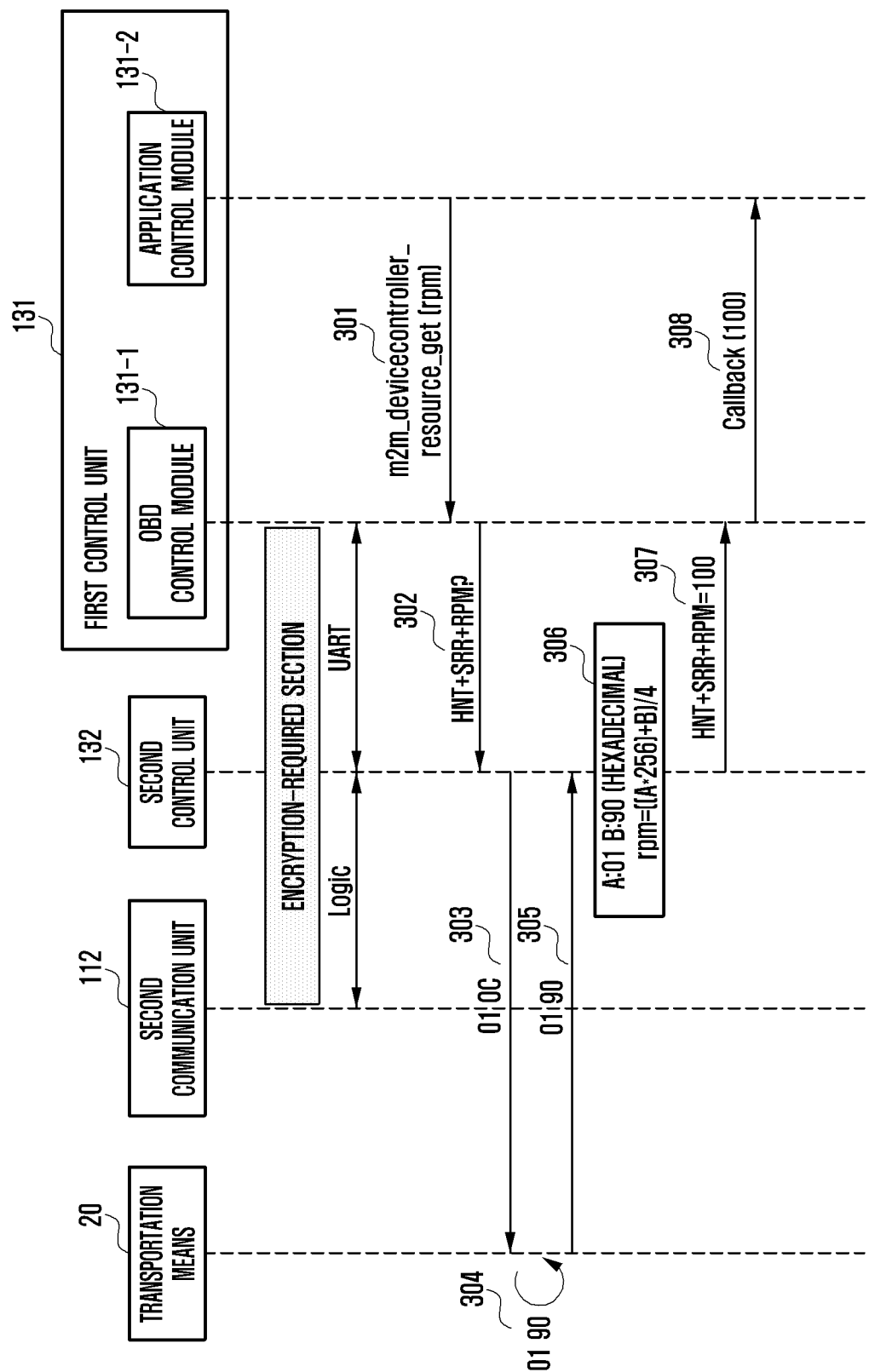
FIG. 3 illustrates a procedure for transmitting command data from a mobile terminal to a transportation means in a transportation means remote control system according to an embodiment of the present disclosure.

FIG. 3 illustrates a procedure for transmitting command data from a mobile terminal to a transportation means in a transportation means remote control system according to an embodiment of the present disclosure.

In reference to FIG. 3, a transportation means remote control system 1 may include a radio communication terminal 10 and a transportation means 20. The radio communication terminal 10 may include a first control unit 131, a second control unit 132, and a second communication unit 112 (e.g., KWP2000 communication module). The first control unit 131 may include an OBD control module 131-1 and an application control module 131-2.

The application control module 131-2 of the first control unit may transmit command data to the OBD control module 131-1 at step 301. The command data may be inquiry command data for inquiring about engine RPM information of the transportation means 20. The command data transmitted by the application control module 131-2 may be an "m2m_device controller_resource_get(rpm)" function.

If the command data is received, the OBD control module 131-1 converts the command data to a format capable of being recognized by the second control unit 132 (e.g., OBD MCU) and transmits the converted command data to the second control unit 132 at step 302. The OBD control module 131-1 may transmit the command data in the format of HNT+SRR+RPM?. Here, HNT is the information indicating the start, SRR is the mode information for identifying the communication, and RPM is the information indicating revolutions per minute. The mark "?" may indicate that the command data is inquiry command data requesting for state information of the transportation means 20.

If the command data is received, the second control unit 132 may convert the instruction data to a format in compliance with the communication protocol of the second communication unit 112 and transmit the converted command data to the transportation means 20 via the second communication unit 112 at step 303. The command data transmitted by the second control unit 132 may include "01 OC" to request for the RPM as the status information of the transportation means 20. The format-converted command data may be data complying with the KWP2000 communication protocol.

If the command data is received, the transportation means 20 may check the RPM as its status information in response to the inquiry command data at step 304.

The transportation means 20 may convert the checked RPM to data complying with a communication protocol of the second communication unit 112 and transmit the data to the second control unit 132 via the second communication unit 112 at step 305. The data carrying the status information transmitted by the transportation means 20 may include "01 90" indicating the RPM of the transportation means 20. The data may be transmitted in a data format complying with the KWP2000 communication protocol.

If the RPM indication data is "01 90", the second control unit 132 may convert the data from a hexadecimal number to a decimal number at step 306. For example, it may be possible to derive "rpm=100" from "01 90" using an equation of "rpm=((A*256)+B)/4".

The second control unit 132 may transmit the calculated value converted in a format capable of being recognized by the OBD control module 131-1 to the OBD control module 131-1 at step 307. The OBD control module 131-1 may transmit the data in the format of "HNT+SRR+RPM=100".

If the status information data is received, the OBD control module 131-1 may process the data into a return value of a callback function and transmit the data to the application control module 131-2 at step 308. For example, the status information transmitted by the OBD control module 131-1 may be a "Callback (100)" value.

Various command data processing methods of the radio communication terminal 10 according to embodiments of the present disclosure are described hereinafter with reference to FIGS. 4 to 7.

The radio communication terminal 10 may determine whether to forward the command data to the transportation means 20 based on the operation status of the transportation means 20. The radio communication terminal 10 may also determine whether to forward the command data to the transportation means 20 based on the type of the command data received from the mobile terminal 30. The radio communication terminal 10 may also determine whether to forward the command data to the transportation means 20 based on the communication protocol used for receiving the command data from the mobile terminal 30. The radio communication terminal 10 may also determine whether to forward the command data to the transportation means 20 based on the operation mode of the mobile terminal 30 that transmits the command data. The radio communication terminal 10 may also determine whether to forward the command data to the transportation means 20 based on whether the mobile terminal 30 has been registered.

Figure 4:
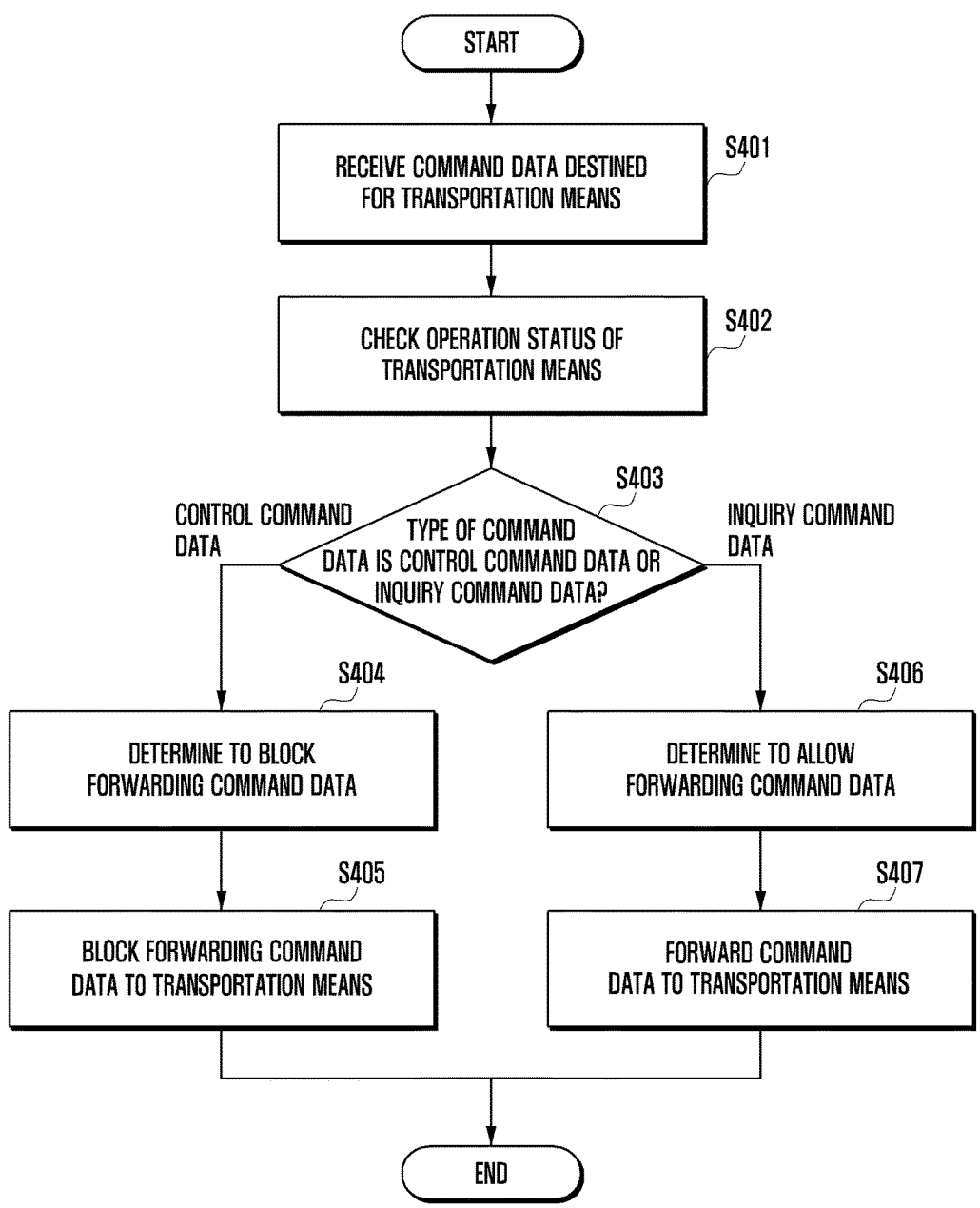
FIG. 4 illustrates a flowchart of a command data processing method of a radio communication terminal for processing command data destined for a transportation means according to an embodiment of the present disclosure.

FIG. 4 illustrates a flowchart of a command data processing method of a radio communication terminal for processing command data destined for a transportation means according to an embodiment of the present disclosure.

In reference to FIG. 4, the radio communication terminal 10 may receive command data destined for the transportation means 20 from the mobile terminal 30 at step S401.

If the command data is received, the radio communication terminal 10 may check the operation status of the transportation means 20 at step S402.

For example, if it is determined that the operation status of the transportation means 20 is "driving", the radio communication terminal 10 may determine whether to forward the command data to the transportation means 20 based on the operation status of the transportation means 20 and the type of the command data. The types of the command data have been described in the context of FIG. 1; therefore, detailed descriptions thereof are omitted herein.

The radio communication terminal 10 may determine at step S403 whether the command data is control command data or inquiry command data.

If it is determined that the command data is control command data, the radio communication terminal 10 may determine to block the transmission of the command data at step S404.

As a consequence, the radio communication terminal 10 may not forward the command data to the transportation means 20 at step S405.

If it is determined that the command data is inquiry command data, the radio communication terminal 10 may determine to allow forwarding the command data to the transportation means 20 at step S406.

As a consequence, the radio communication terminal 10 may forward the command data to the transportation means 20 at step S407.

In FIG. 4, step S402 may be omitted. In this case, the radio communication terminal 10 may determine whether to forward the command data to the transportation means 20 based on the type of the command data regardless of the operation status of the transportation means 20.

Figure 5:
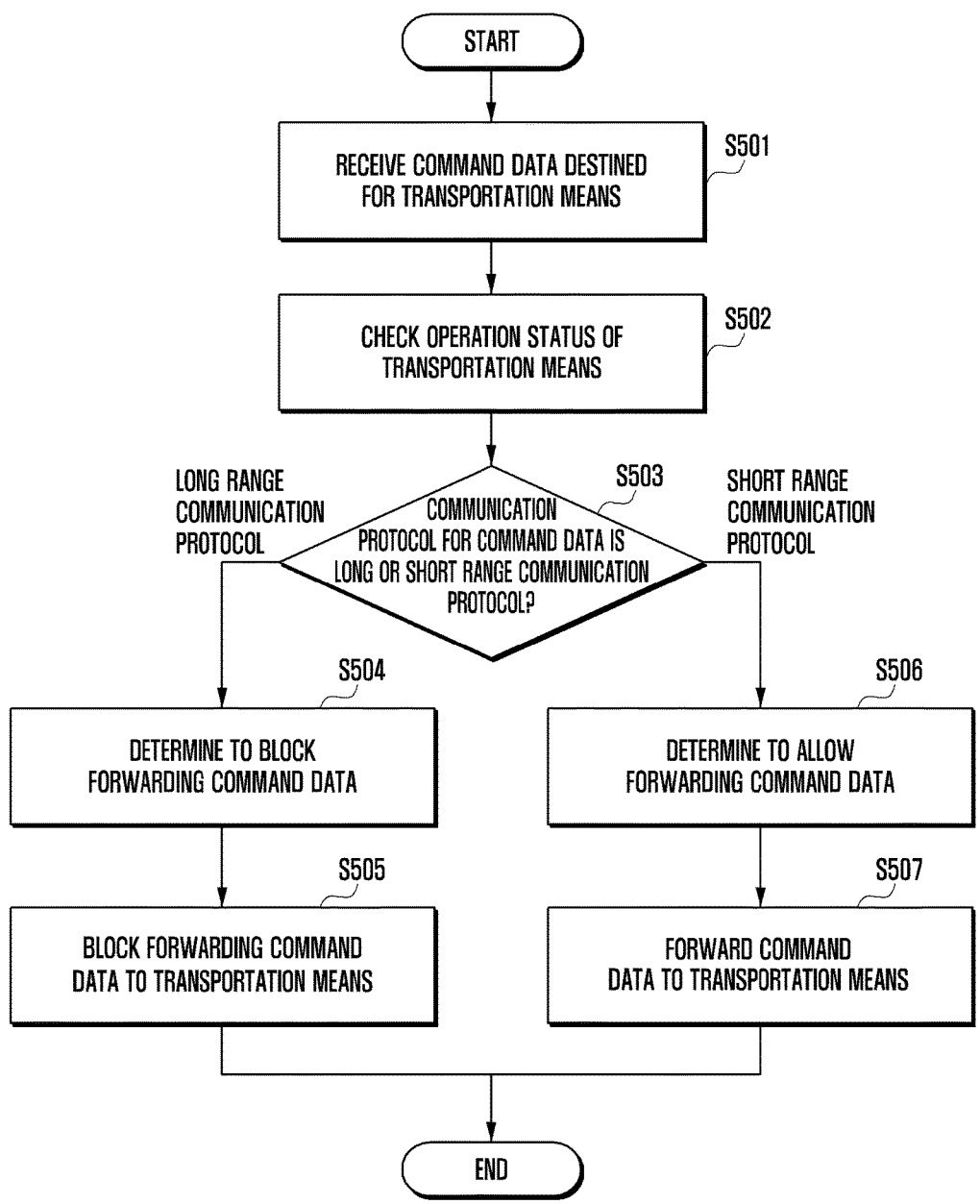
FIG. 5 illustrates a flowchart of a command data processing method of a radio communication terminal for processing command data destined for a transportation means according to another embodiment of the present disclosure.

FIG. 5 illustrates a flowchart of a command data processing method of a radio communication terminal for processing command data destined for a transportation means according to another embodiment of the present disclosure.

Referring to FIG. 5, the radio communication terminal 10 may receive command data destined for the transportation means 20 from the mobile terminal 30 at step S501.

If the command data is received, the radio communication terminal 10 may check the operation status of the transportation means 20 at step S502.

If it is determined that the operation status of the transportation means 20 is "driving", the radio communication terminal 10 may determine whether to forward the command data to the transportation means 20 based on the operation status of the transportation means 20 and the communication protocol used for receiving the command data. In this case, it may be possible to determine whether the mobile terminal 30 that has transmitted the command data is located inside or outside the transportation means 20.

For example, the radio communication terminal 10 may determine at step S503 whether the communication protocol used for receiving the command data is a long range communication protocol or a short range communication protocol.

If the communication protocol used for receiving the command data is a long range communication protocol, this means that the command data is received from the mobile terminal 30 located outside the transportation means 20. In this case, the radio communication terminal 10 may assume that a third party is attempting to control the transportation means 20 from outside the transportation means 20. If the communication protocol used for receiving the command data is a short range communication protocol, this means that the command data is received from the mobile terminal 30 located inside the transportation means 20. In this case, the radio communication terminal 10 may assume that a user of the transportation means 20 is attempting to control the transportation means 20 from inside the transportation means 20.

Examples of the long range communication protocol may include an LTE® protocol, a 3G mobile communication protocol, and a WI-FI® protocol that allow an external device located outside the transportation means 20 to transmit data to the transportation means 20. Examples of the short range communication protocol may include a BLUETOOTH® (BT) protocol, a USB protocol, and a NFC protocol that allow short range wireless connection inside the transportation means 20.

If it is determined that the communication protocol used for receiving the command data is a long range communication protocol, the radio communication terminal 10 may determine to block transmission of the command data to the transportation means 20 at step S504.

As a consequence, the radio communication terminal 10 may not forward the command data to the transportation means 20 at step S505.

If it is determined that the communication protocol used for receiving the command data is a short range communication protocol, the radio communication terminal 10 may determine to allow forwarding the command data to the transportation means at step S506.

As a consequence, the radio communication terminal 10 may forward the command data to the transportation means 20 in step S507.

In FIG. 5, step S502 may be omitted. In this case, the radio communication terminal 10 may determine whether to forward the command data to the transportation means 20 based on the communication protocol used for receiving the command data regardless of the operation status of the transportation means 20.

Figure 6:
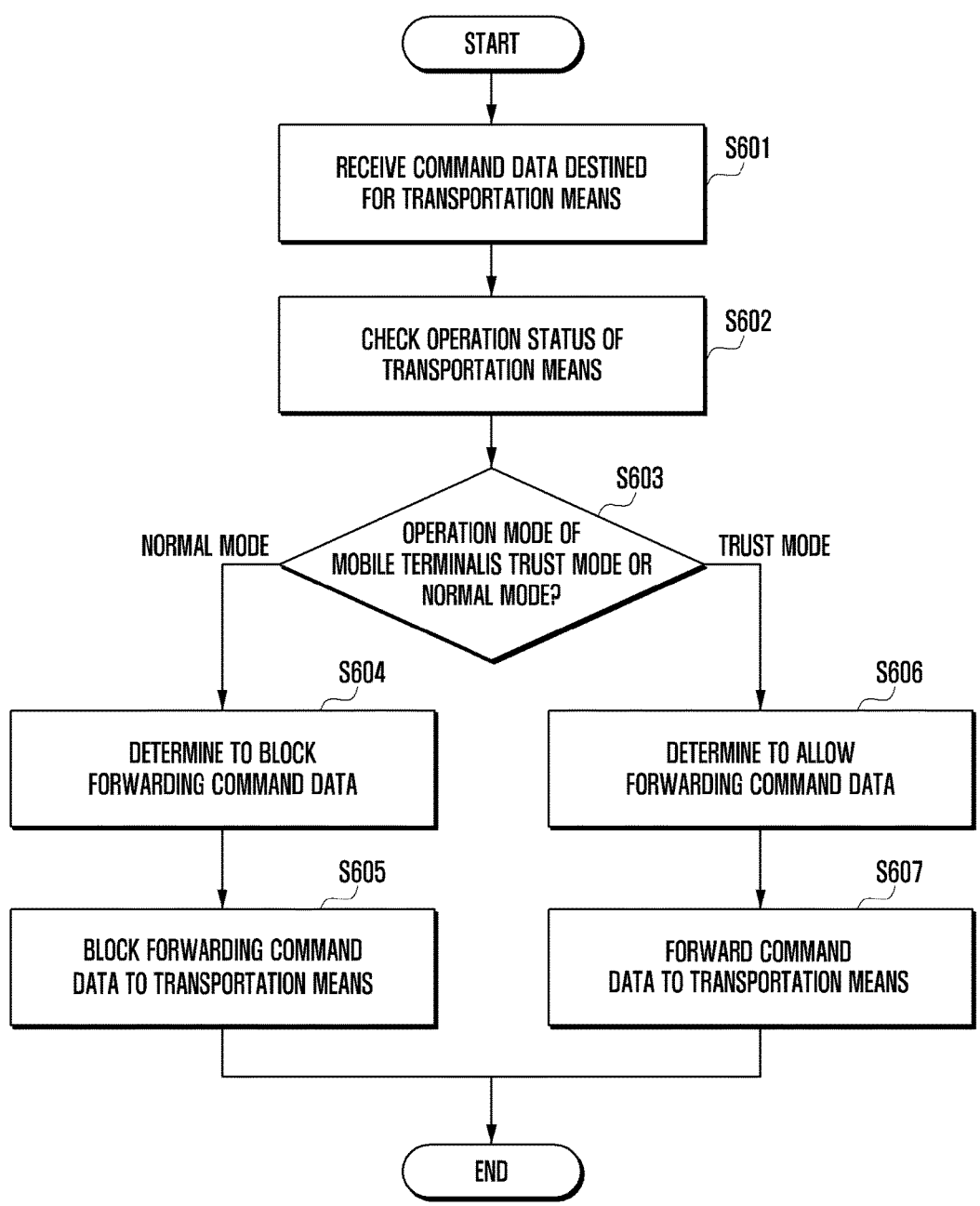
FIG. 6 illustrates a flowchart of a command data processing method of a radio communication terminal for processing command data destined for a transportation means according to another embodiment of the present disclosure.

FIG. 6 illustrates a flowchart of a command data processing method of a radio communication terminal for processing command data destined for a transportation means according to another embodiment of the present disclosure.

In reference to FIG. 6, the radio communication terminal 10 may receive command data destined for the transportation means 20 from the mobile terminal 30 at step S601.

If the command data is received, the radio communication terminal 10 may check the operation status of the transportation means 20 at step S602.

For example, if it is determined that the operation status of the transportation means 20 is "driving", the radio communication terminal 10 may determine whether to forward the command data to the transportation means 20 based on the checked operation status and the operation mode of the mobile terminal 30 that has transmitted the command data.

For example, the radio communication terminal 10 may determine at step S603 whether the operation status of the mobile terminal 30 is a trust mode (e.g., SAMSUNG KNOX® mode) or a normal mode.

For example, the received command data may include a flag indicating the operation mode of the mobile terminal 30. In this case, the radio communication terminal 10 may parse the operation mode flag to determine whether the operation mode of the mobile terminal 30 is the trust mode or the normal mode.

According to an embodiment of the present disclosure, the radio communication terminal 10 may transmit the command data including an inquiry about the operation status of the mobile terminal 30 and receive the operation status information of the mobile terminal 30. The radio communication terminal 10 may parse the operation status information received from the mobile terminal 30 to determine whether the mobile terminal is operating in the trust mode or the normal mode.

According to an embodiment of the present disclosure, the trust mode and the normal mode may be implemented differently in hardware. For example, the trust mode and the normal mode may execute an application with different bootloaders and kernels. The trust mode may be implemented in such a way of installing and executing an application in a separate trust zone of the memory.

In this case, specific applications designated by the user of the transportation means 20 or authorized by the manufacturer of the mobile terminal 30 may be installed or executed in the trust mode. In contrast, general applications may be installed or executed in the normal mode. The user or the manufacturer may install or execute the application in the trust mode for controlling the transportation means 20, while a third party may attempt installing or executing a malicious application in the normal mode for controlling the transportation means 20.

If it is determined that the mobile terminal 30 is operating in the normal mode, the radio communication terminal 10 may determine to block the transmission of the command data to the transportation means 20 at step S604.

In this case, the radio communication terminal 10 may not forward the received command data to the transportation means 20 at step S605.

If it is determined that the mobile terminal 30 is operating in the trust mode, the radio communication terminal 10 may determine to allow the transmission of the received command data to the transportation means 20 at step S606.

In this case, the radio communication terminal 10 may forward the command data to the transportation means 20 at step S607.

In FIG. 6, step S602 may be omitted. In this case, the radio communication terminal 10 may determine whether to forward the command data to the transportation means 20 based on the operation mode of the mobile terminal 30 regardless of the operation status of the transportation means 20.

Figure 7:
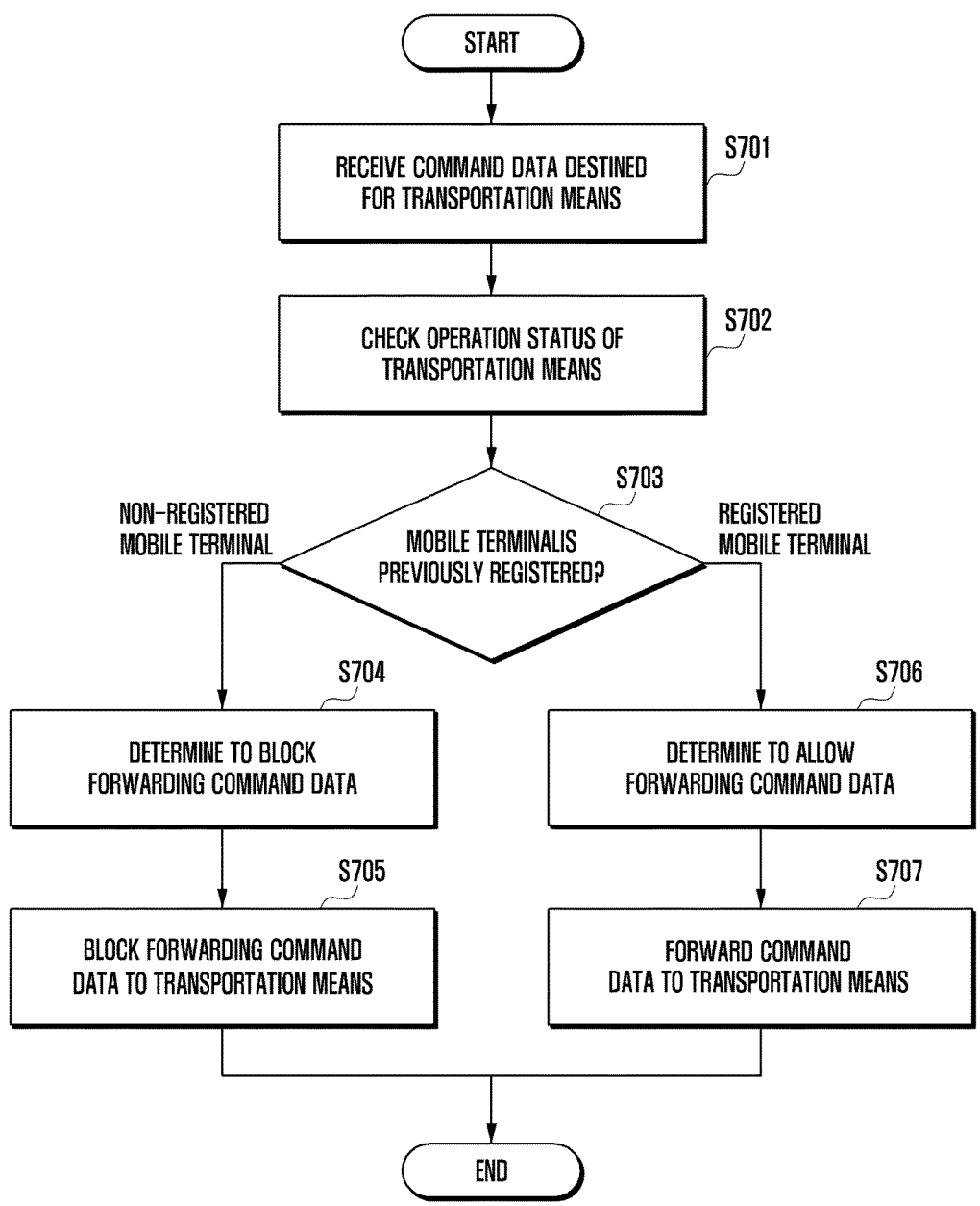
FIG. 7 illustrates a flowchart of a command data processing method of a radio communication terminal for processing command data destined for a transportation means according to another embodiment of the present disclosure.

FIG. 7 illustrates a flowchart of a command data processing method of a radio communication terminal for processing command data destined for a transportation means according to another embodiment of the present disclosure.

In reference to FIG. 7, the radio communication terminal 10 may receive command data destined for the transportation means 20 from the mobile terminal 30 at step S701.

If the command data is received, the radio communication terminal 10 may check the operation status of the transportation means 20 at step S702.

For example, if it is determined that the operation status of the transportation means 20 is "driving", the radio communication terminal 10 may determine whether to forward the command data to the transportation means 20 based on the checked operation status and on whether the mobile terminal 30 that has transmitted the command data is a registered mobile terminal.

The radio communication terminal 10 may determine at step S703 whether the mobile terminal 30 is a registered mobile terminal or a non-registered mobile terminal.

The user of the transportation means 20 may register the mobile terminal 30 in use with a data transmission-allowed device list. The data transmission-allowed device list may include identity information of at least one mobile terminal previously registered by the user. The data transmission-allowed device list may be stored in the storage unit 120 of the radio communication terminal or received from the external server 40 whenever necessary.

According to an embodiment of the present disclosure, the received command data may include the identity information of the mobile terminal 30. In this case, the radio communication terminal 10 may determine whether the received identity information is contained in the data transmission-allowed device list. If the received identity information is contained in the data transmission-allowed device list, the radio communication terminal 10 may determine that the mobile terminal is a previously registered mobile terminal.

According to an embodiment of the present disclosure, the radio communication terminal 10 may request to the mobile terminal 30 for identity information thereof. The radio communication terminal 10 may determine whether the received identity information is contained in the data transmission-allowed device list. If the identity information is contained in the data transmission-allowed device list, the radio communication terminal 10 may determine that the mobile terminal 30 is a previously registered mobile terminal. The radio communication terminal 10 may request for the identity information to the mobile terminal 30 or the external server 40.

According to an embodiment of the present disclosure, the radio communication terminal 10 may acquire the identity information of the mobile terminal located close to the radio communication terminal 10 using a short range communication protocol (e.g., BT and NFC communication protocols). The radio communication terminal 10 may determine whether the acquired identity information of the mobile terminal is contained in the data transmission-allowed device list. If the acquired identity information is contained in the data transmission-allowed device list, the radio communication terminal 10 may determine that the mobile terminal 30 is a previously registered mobile terminal.

If it is determined that the mobile terminal 30 is a non-registered mobile terminal, the radio communication terminal 10 may determine to block forwarding the transmission of the command data at step S704.

In this case, the radio communication terminal 10 may not forward the command data to the transportation means 20 at step S705.

If it is determined that the mobile terminal 30 is a previously registered device, the radio communication terminal 10 may determine to allow forwarding the command data at step S706.

In this case, the radio communication terminal 10 may forward the command data to the transportation means 20 at step S707.

In FIG. 7, step S702 may be omitted. In this case, the radio communication terminal 10 may determine whether to forward the command data to the transportation means 20 based on whether the mobile terminal 30 is a registered mobile terminal regardless of the operation status of the transportation means 20.

At least two of the command data processing methods of the radio communication terminal 10 that have been described with reference to FIGS. 4 to 7 may be combined for performance enhancement.

For example, the radio communication terminal 10 may determine whether to forward the command data to the transportation means 20 based on the operation status of the transportation means 20. In this case, the radio communication terminal 10 may determine again whether to forward the command data to the transportation means 20 based on the communication protocol used for receiving the command data. The radio communication unit 10 may determine again whether to forward the command data to the transportation means 20 based on the operation mode of the mobile terminal 30 that has transmitted the command data. The radio communication terminal 10 may determine again whether to forward the command data to the transportation means 20 based on whether the mobile terminal 30 has been registered.

Figure 8:
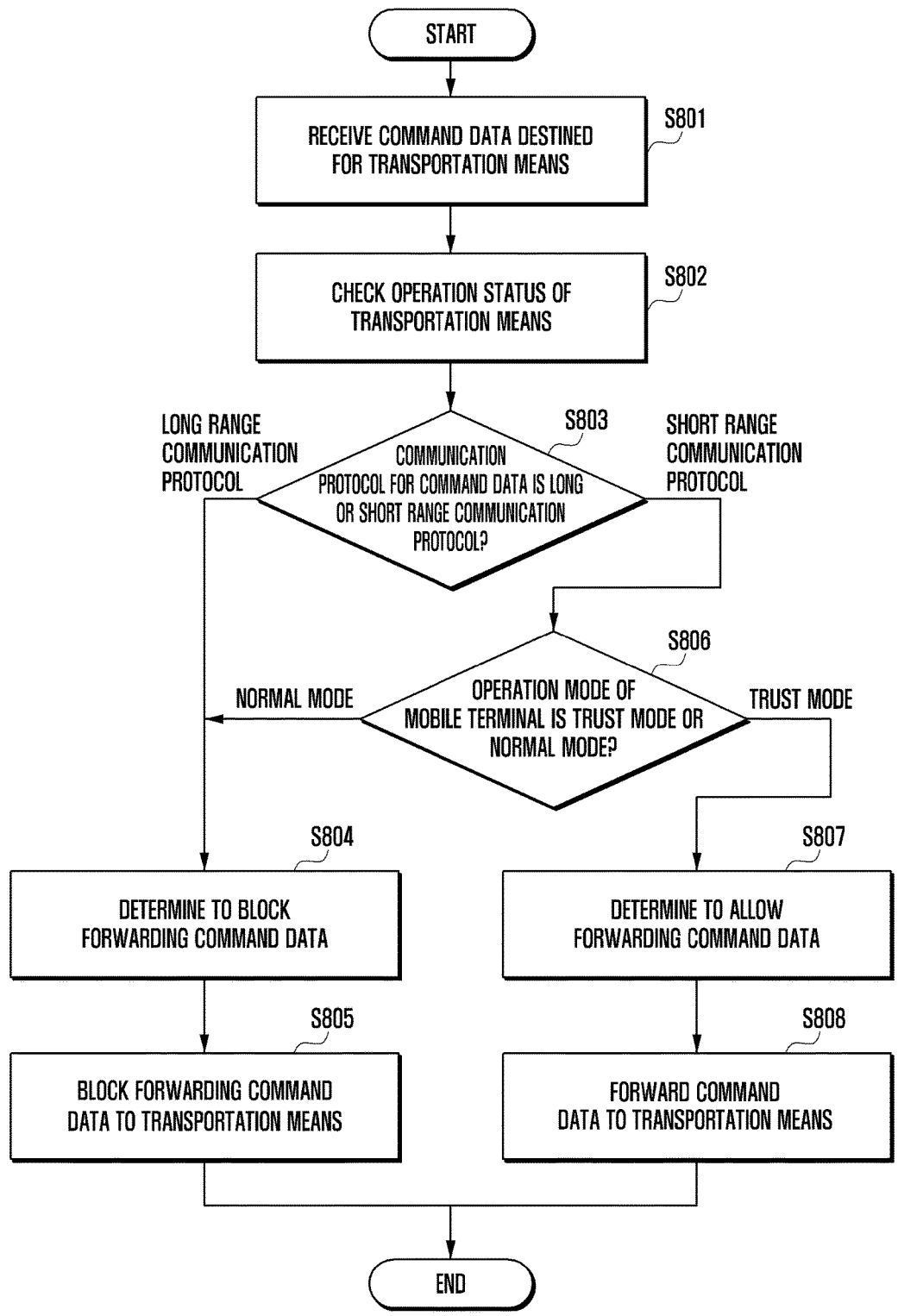
FIG. 8 illustrates a flowchart of a command data processing method of a radio communication terminal for processing command data destined for a transportation means according to another embodiment of the present disclosure.

FIG. 8 illustrates a flowchart of a command data processing method of a radio communication terminal for processing command data destined for a transportation means according to another embodiment of the present disclosure.

In reference to FIG. 8, the radio communication terminal 10 may receive command data destined for the transportation means 20 from the mobile terminal 30 at step S801.

If the command data is received, the radio communication terminal 10 may check the operation status of the transportation means 20 at step S802.

For example, if it is determined that the operation status of the transportation means 20 is "driving", the radio communication terminal 10 may determine at step S803 whether the communication protocol used for receiving the command data is a long range communication protocol or a short range communication protocol.

If it is determined that the communication protocol used for receiving the command data is a long range communication protocol, the radio communication terminal 10 may determine to block forwarding the received command data at step S804.

In this case, the radio communication terminal 10 may not forward the received command data to the transportation means 20 at step S805.

If it is determined that the communication protocol used for receiving the command data is a short range communication protocol, the radio communication terminal 10 may determine at step S806 whether the operation mode of the mobile terminal 30 is the trust mode or the normal mode.

If it is determined that the mobile terminal 30 is operating in the normal mode, the radio communication terminal 10 may determine to block forwarding the received command data at step S804.

In this case, the radio communication terminal 10 may not forward the received command data to the transportation means 20 at step S805.

If it is determined that the mobile terminal is operating in the trust mode, the radio communication terminal 10 may determine to allow forwarding the received command data at step S807.

In this case, the radio communication terminal 10 may forward the received command data to the transportation means 20 at step S808.

Figure 9:
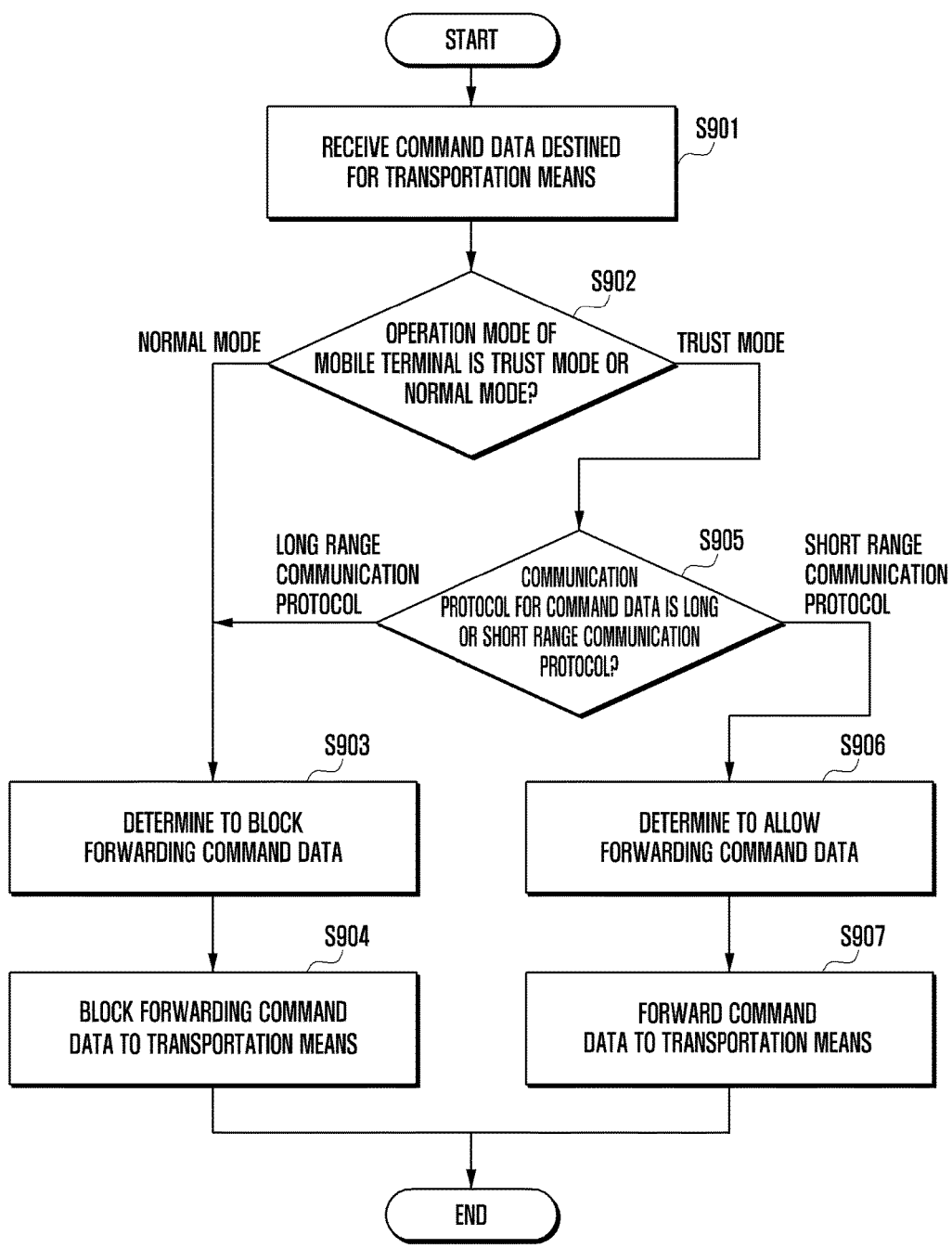
FIG. 9 illustrates a flowchart of a command data processing method of a radio communication terminal for processing command data destined for a transportation means according to another embodiment of the present disclosure.

FIG. 9 illustrates a flowchart of a command data processing method of a radio communication terminal for processing command data destined for a transportation means according to another embodiment of the present disclosure.

In reference to FIG. 9, the radio communication terminal 10 may receive command data destined for the transportation means 20 from the mobile terminal 30 at step S901.

If the command data is received, the radio communication terminal 10 may determine at step S902 whether the mobile terminal 30 is operating in the trust mode or the normal mode.

If it is determined that the mobile terminal 30 is operating in the normal mode, the radio communication terminal 10 may determine to block forwarding the received command data at step S903.

In this case, the radio communication terminal 10 may not forward the received command data to the transportation means 20 at step S904.

If it is determined that the mobile terminal is operating in the trust mode, the radio communication terminal 10 may determine at step S905 whether the communication protocol used for receiving the command data is a long range communication protocol or a short range communication protocol.

If it is determined that the communication protocol is a long range communication protocol, the radio communication terminal 10 may determine to block forwarding the received command data at step S903.

In this case, the radio communication terminal 10 may not forward the received command data to the transportation means 20.

If it is determined that the communication protocol is a short range communication protocol, the radio communication terminal 10 may determine to allow forwarding the received command data at step S906.

In this case, the radio communication terminal 10 may forward the received command data to the transportation means 20 at step S907.

Figure 10:
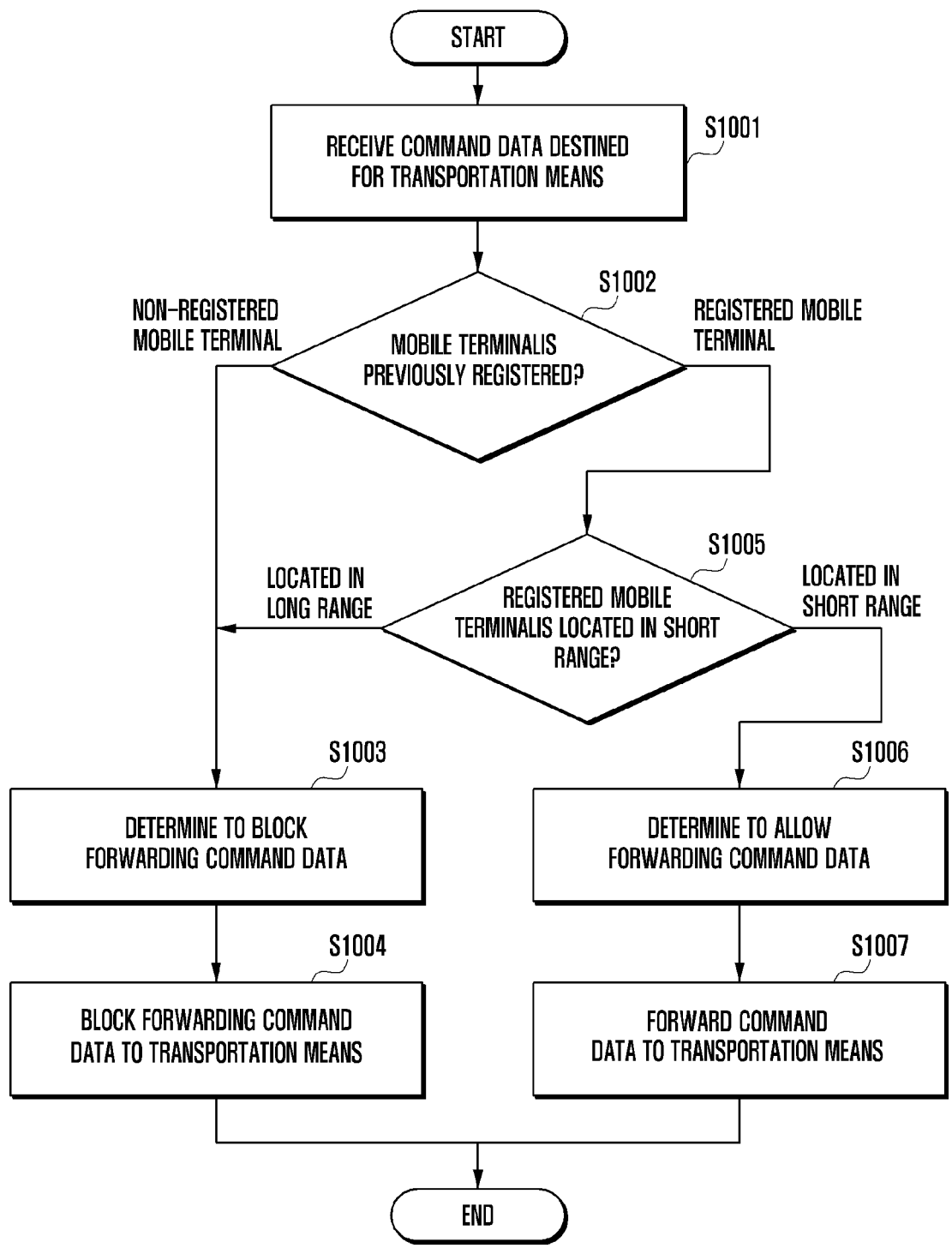
FIG. 10 illustrates a flowchart of a command data processing method of a radio communication terminal for processing command data destined for a transportation means according to another embodiment of the present disclosure.

FIG. 10 illustrates a flowchart of a command data processing method of a radio communication terminal for processing command data destined for a transportation means according to another embodiment of the present disclosure.

In reference to FIG. 10, the radio communication terminal 10 may receive command data destined for the transportation means 20 from the mobile terminal 30 at step S1001.

If the command data is received, the radio communication terminal 10 may determine at step S1002 whether the mobile terminal 30 is a registered terminal or a non-registered terminal.

If it is determined that the mobile terminal 30 is a non-registered terminal, the radio communication terminal 10 may determine to block forwarding the received command data at step S1003.

In this case, the radio communication terminal 10 may not forward the received command data to the transportation means 20 at step S1004.

If it is determined that the mobile terminal 30 is a registered terminal, the radio communication terminal 10 may determine at step S1005 whether the mobile terminal that has transmitted the command data is located close to it. It may be possible to acquire the identity information of the mobile terminal located close to the radio communication terminal 10 using a short range communication protocol (e.g., BT and NFC communication protocol). In this case, the radio communication terminal 10 may determine whether the acquired identity information of the mobile terminal is contained in a data transmission-allowed device list.

If it is determined that the mobile terminal is located far from the radio communication terminal 10, the radio communication terminal 10 may block forwarding the received command data at step S1003.

In this case, the radio communication terminal 10 may not transmit the received command data to the transportation means 20 at step S1004.

If it is determined that the mobile terminal is located close to the radio communication terminal 10, the radio communication terminal 10 may determine to allow forwarding the received command data at step S1006.

In this case, the radio communication terminal 10 may forward the received command data to the transportation means 20 in step S1007.

Figure 11:
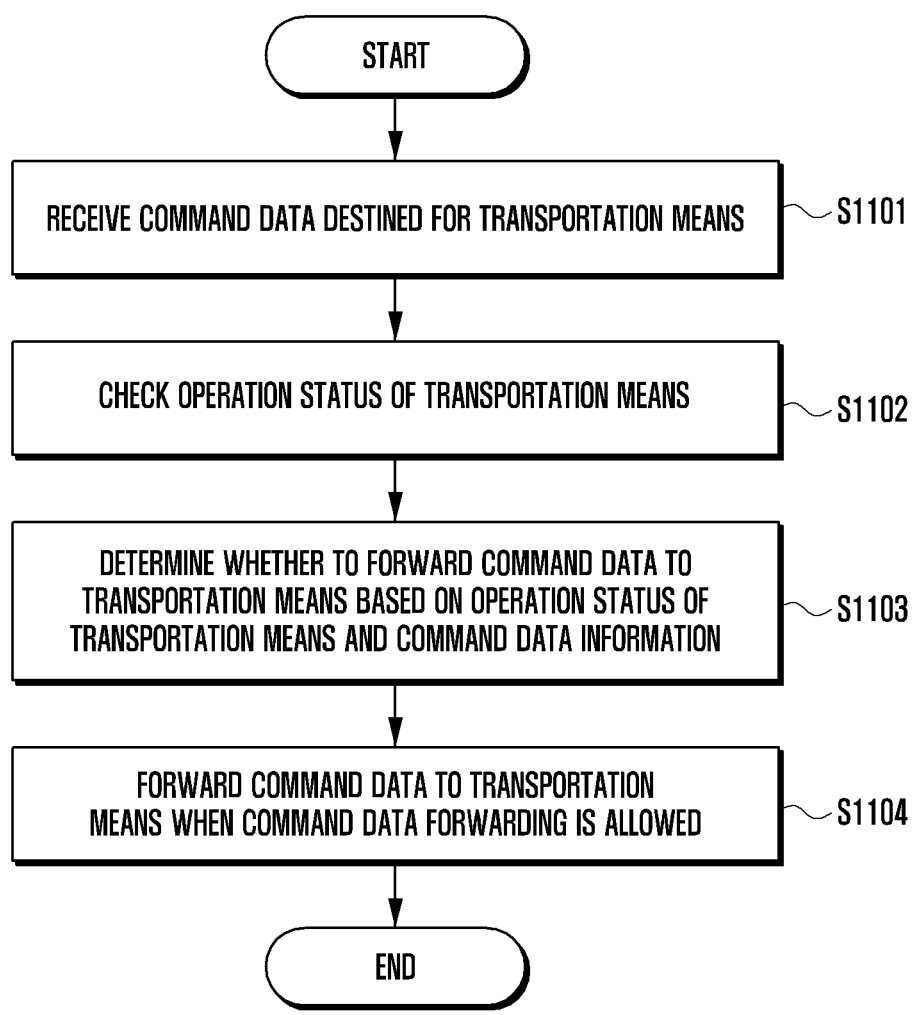
FIG. 11 illustrates a flowchart of a command data processing method of a radio communication terminal for processing command data destined for a transportation means according to another embodiment of the present disclosure.

FIG. 11 illustrates a flowchart of a command data processing method of a radio communication terminal for processing command data destined for a transportation means according to another embodiment of the present disclosure.

In reference to FIG. 11, the radio communication terminal 10 may receive command data destined for the transportation means 20 from the mobile terminal 30 at step S1101.

The radio communication terminal 10 may check the operation status of the transportation means 20 at step S1102. Step S1102 may be performed before step 1101.

The radio communication terminal 10 may determine at step S1103 whether to forward the command data to the transportation means 20 based on information concerning the received command data and the operation status of the transportation means 20.

If it is determined to forward the command data, the radio communication terminal 10 may forward the command data to the transportation means 20 in step S1104.

FIG. 12 illustrates a flowchart of a command data processing method of a radio communication terminal for processing command data destined for a transportation means according to another embodiment of the present disclosure.

In reference to FIG. 12, the radio communication terminal 10 may receive command data destined for the transportation means 20 from the mobile terminal 30 at step S1201.

The radio communication terminal 10 may check the operation status of the transportation means 20 at step S1202. Step S1202 may be performed before step S1201.

The radio communication terminal 10 may determine, at step S1203, to forward the command data to the transportation means 20 based on the information concerning the command data and the operation status of the transportation means 20.

According to an embodiment of the present disclosure, the radio communication terminal 10 may determine whether to forward the command data to the transportation means 20 based on the communication protocol used for receiving the command data. For example, the radio communication terminal 10 may determine to forward the command data to the transportation means 20 in the case where the communication protocol used for receiving the command data is a short range communication protocol and not to forward the command data to the transportation means 20 in the case where the communication protocol used for receiving the command data is a long range communication protocol.

According to an embodiment of the present disclosure, the radio communication terminal 10 may determine whether to forward the command data to the transportation means 20 based on the type of the command data. For example, the radio communication terminal may determine to forward the command data to the transportation means 20 in the case where the type of the command data is inquiry command data for inquiring about the operation state of the transportation means 20 and not to forward the command data to the transportation means 20 in the case where type of the command data is a control command data for controlling the transportation means 20.

According to an embodiment of the present disclosure, the radio communication terminal 10 may determine whether to forward the command data to the transportation means 20 based on the operation mode of the mobile terminal 30 that has transmitted the command data. For example, the radio communication terminal 10 may determine to forward the command data to the transportation means 20 in the case where the mobile terminal 30 is operating in the trust mode and not to forward the command data to the transportation means 20 in the case where the mobile terminal 30 is operating in the normal mode.

According to an embodiment of the present disclosure, the radio communication terminal 10 may determine whether to forward the command data to the transportation means 20 based on the identity information of the mobile terminal 30. For example, the radio communication terminal 10 may determine to forward the command data to the transportation means 20 in the case where the identity information of the mobile terminal 30 has been registered previously and not to forward the command data to the transportation means 20 in the case where the identity information of the mobile terminal 30 has not been registered previously.

The radio communication terminal 10 may determine whether the command data is allowed to be forwarded at step S1204.

If it is allowed to forward the command data, the radio communication terminal 10 may forward the command data to the transportation means 20 at step S1205.

Otherwise, if it is not allowed to forward the command data, the radio communication terminal 10 may block forwarding the instruction to the transportation means 20 at step S1206

Figure 13A:
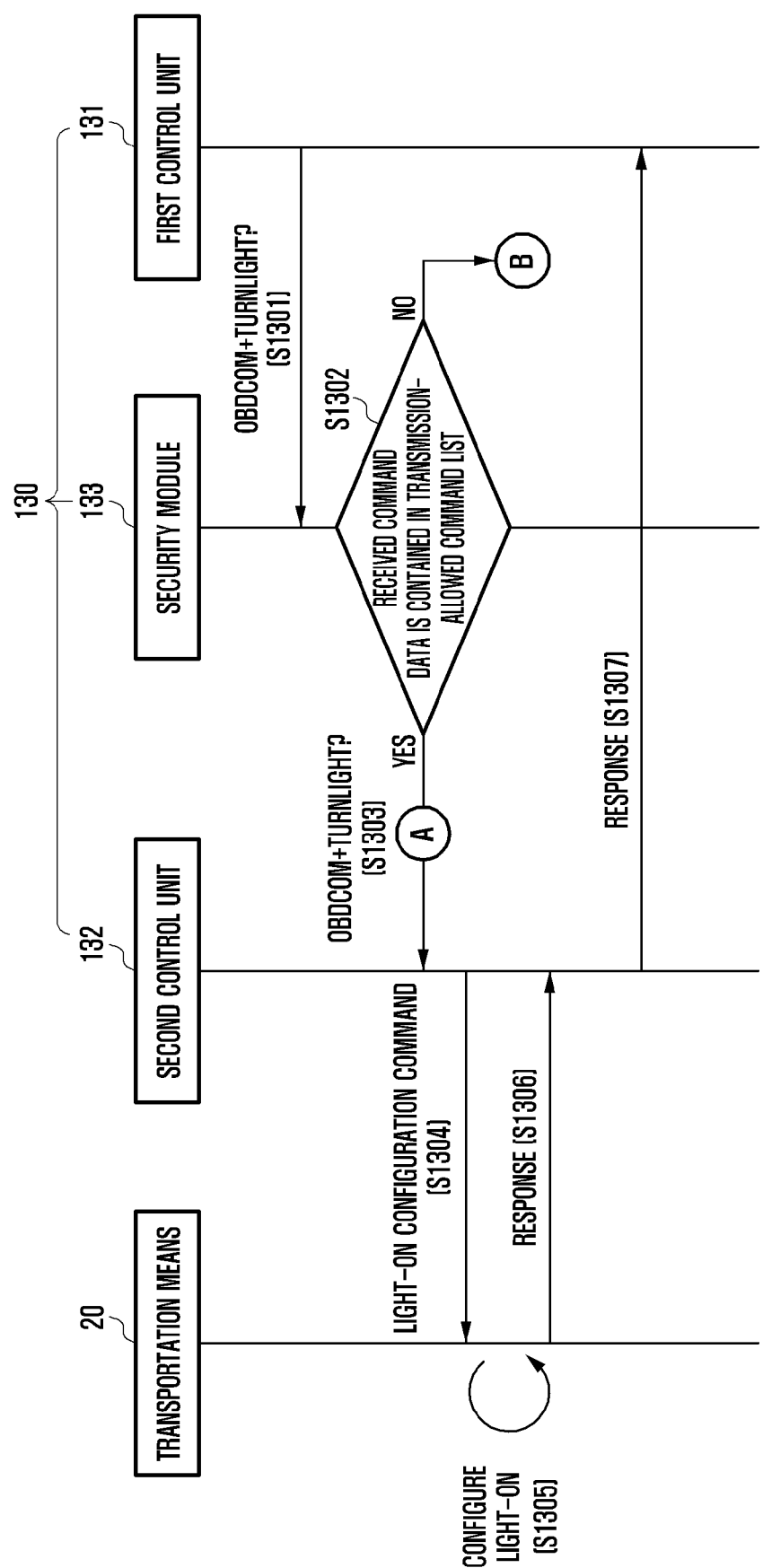
Figure 13B:
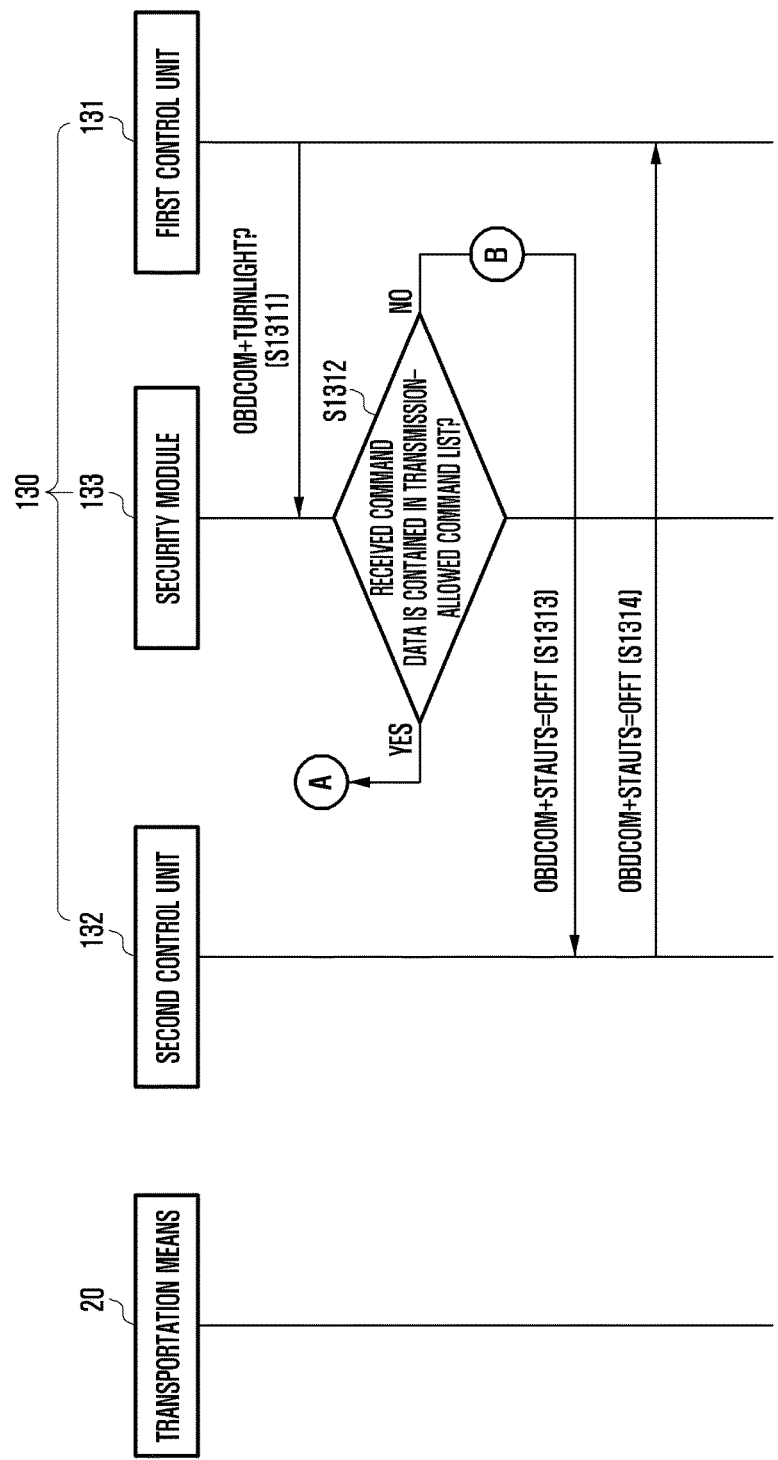

FIGS. 13A to 13C illustrate a procedure for a radio communication terminal to handle command data transmitted to a transportation means.

In reference to FIGS. 13A to 13C, the control unit 130 may include a first control unit 131, a second control unit 132, and a security module 133.

FIG. 13A shows signal flows in a situation where the command data to be transmitted to the transportation means 20 is contained in the transmission-allowed command list, and FIGS. 13B and 13C show signal flows in a situation where the command data to be transmitted to the transportation means 20 is not contained in the transmission-allowed command list.

According to an embodiment of the present disclosure, the first control unit 131 may transmit command data to the security module 133 at step S1301. The command data may be command data for turning on the lights of the transportation means 20. The command data may be transmitted in the format of "OBDCOM+TURNONLIGHT?". In this case, "OBDCOM" may be the information indicating that the command data relates to an operation of the OBD, "TURNONLIGHT" may be the information indicating that the command data relates to turning on the lights of the transportation means 20, and "?" may be the information indicating that the command data relates to a request for configuration of the transportation means 20.

If the command data is received, the security module 133 may determine at step S1302 whether the received command data is contained in the transmission-allowed command list.

If it is determined that the received command data is contained in the transmission-allowed command list at step S1302, the security module 133 may transmit the received command data to the second control unit 132 at step S1303. Otherwise, if it is determined that the received command data is not contained in the transmission-allowed command list at step S1302, the security module 133 may block forwarding of the received command data to the transportation means 20. The operation of blocking the forwarding of the command data is described in association with branch "B" of FIGS. 13B and 13C.

If the command data is received, the second control unit 132 converts the received command data into a format recognizable by the transportation means 20 and forwards the converted command data to the transportation means 20 at step S1304. In this case, the converted command data may be command data for turning on the lights of the transportation means 20.

If the command data is received, the transportation means 20 may turns on its lights at step S1305. Then the transportation means 20 may transmit to the second control unit 132 a reply indicating the turn-on of the lights at step S1306.

If the response is received, the second control unit 132 may forward the response to the first control unit 131 at step S1307.

According to an embodiment of the present disclosure, the first control unit 131 may transmit the command data to the security module 133 at step S1311 of FIG. 13B. The format of the command data has been described in association with step S1301; therefore, a detailed description thereof is omitted herein.

If the command data is received, the security module 133 may determine at step S1312 whether the received command data is contained in the transmission-allowed command list.

If it is determined at step S1312 that the received command data is not included in the transmission-allowed command list, the security module 133 may transmit to the second control unit 132 the information indicating the blockage of transmission of the command data to the transportation means 20 at step S1313. The second control unit 132 may transmit the command data blockage information to the first control unit 131 at step S1314.

The command data blockage information may be generated in the format of "OBDCOM+STATUS=OFF". In this case, the "OBDCOM" may the information indicating that the command data relates to an operation of the OBD, "STATUS" may be the information indicating the status of the command data, and "OFF" may be the information indicating that the instruction data is blocked so as not to be forwarded. Here, the "OFF" value may be subcategorized according to the type of command data blockage. For example, the "OFF" may be set to "EH001" to indicate that the received command data is not contained in the transmission-allowed command list. The "OFF" may also be set to "EH002" to indicate that the command data is erroneous in form. The "OFF" may also be set to "EH003" to indicate that the size of the command data is greater than a threshold value. The "OFF" may also be set to "EH004" to indicate that a field value of the command data does not fulfil a given form.

If it is determined at step S1312 that the received command data is included in the transmission-allowed command list, the security module 133 may transmit the received command data to the second control unit 132. The operation related to this step has been described in association with the reference letter "A" of FIG. 13A; therefore, a detailed description thereof is omitted herein.

According to an embodiment of the present disclosure, the first control unit 131 may transmit the command data to the security module 133 at step S1321 of FIG. 13C. Examples of the command data have been described in association with step S1301 of FIG. 13A; therefore, a detailed description thereof is omitted herein.

If the command data is received, the security module 133 may determine whether the command data is contained in the transmission-allowed command list at step S1322.

If it is determined at step S1322 that the command data is not contained in the transmission-allowed command list, the security module 133 may directly transmit to the first control unit 131 the command data blockage information indicating that the command data is blocked so as not to be forwarded to the transportation means 20, without relay by the second control unit 132 at step S1323.

If it is determined at step S1322 that the command data is contained in the transmission-allowed command list, the security module 133 may transmit the command data to the second control unit 132. The operation related to this step has been described in association with the reference letter "A" of FIG. 13A; therefore, a detailed description thereof is omitted herein.

In FIGS. 13B and 13C, if the command data blockage information is received, the first control unit 131 may transmit the command data blockage information to an external device connected to the radio communication terminal.

For example, if there is a mobile terminal 30 in short range communication with the radio communication terminal 10, the radio communication terminal 10 may transmit at least one of command data blockage type and the blocked command data information to the mobile terminal 30 that is in short range communication with the radio communication terminal 10. In this case, the mobile terminal 30 may display on its screen the information on the blocked command data and cause of data transmission failure.

It there is no mobile terminal 30 that is in short range communication with the radio communication terminal 10, the radio communication terminal 10 may transmit the information on the blocked command data and command data blockage type to the external server 40 that is in long range communication with the radio communication terminal 10. In this case, the external server 40 may search for a mobile terminal that has registered the radio communication terminal 10 with the external server 40. If the mobile terminal that has registered the radio communication terminal 10 with the external server 40 is found, the external server 40 may transmit the information on the blocked command data and blockage type of the command data to the corresponding mobile terminal 30. In this case, the mobile terminal 30 may display on its screen the information on the blocked command data and cause of the command data transmission failure.

By displaying the information on the blocked command data and cause of the command data transmission failure on the mobile terminal owned by the driver of the transportation means 20, the driver may be warned about any third party's illegal access (hacking) attempt to the transportation means 20 or the radio communication terminal 10.

Figure 14A:
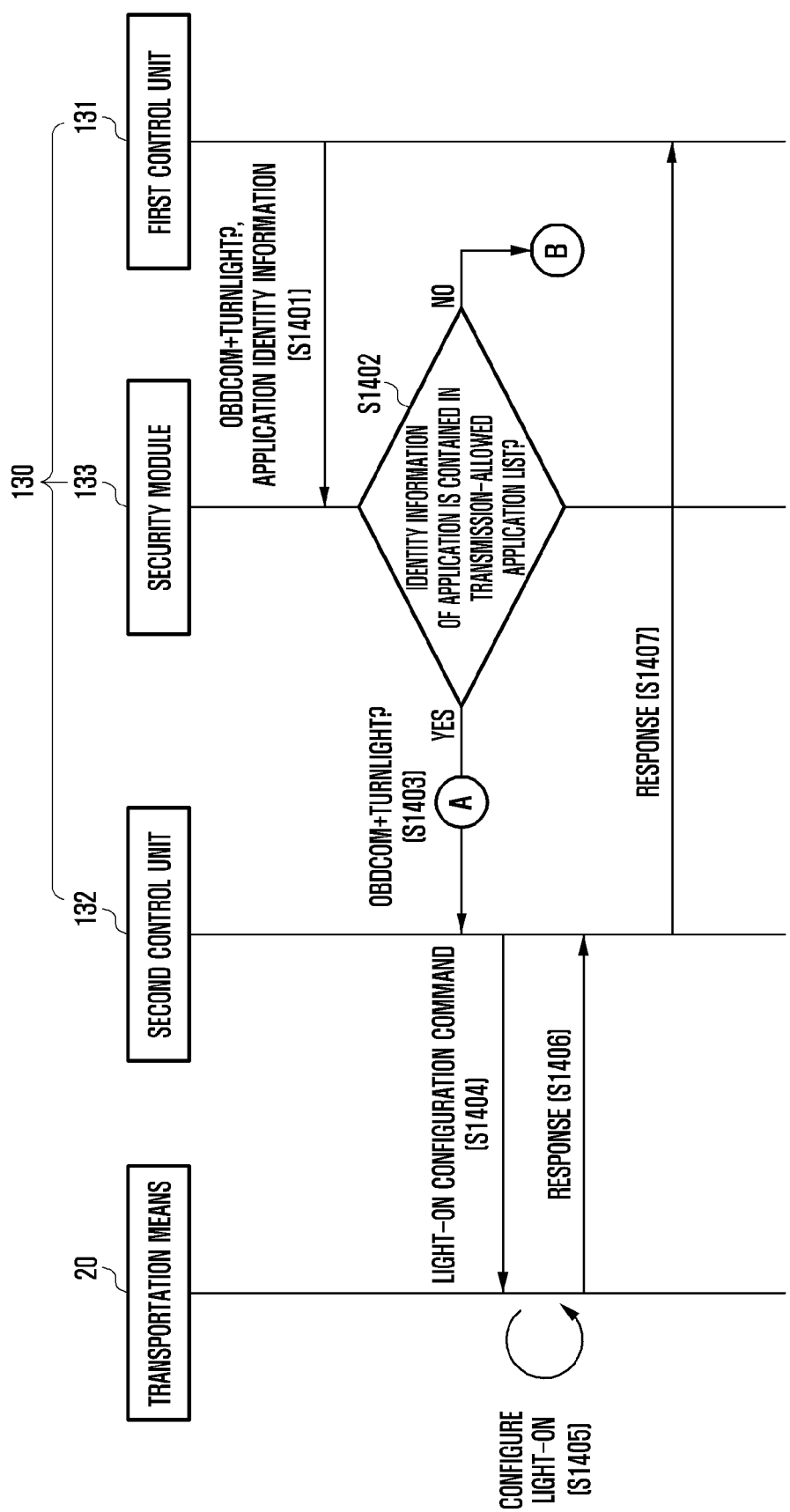
Figure 14B:
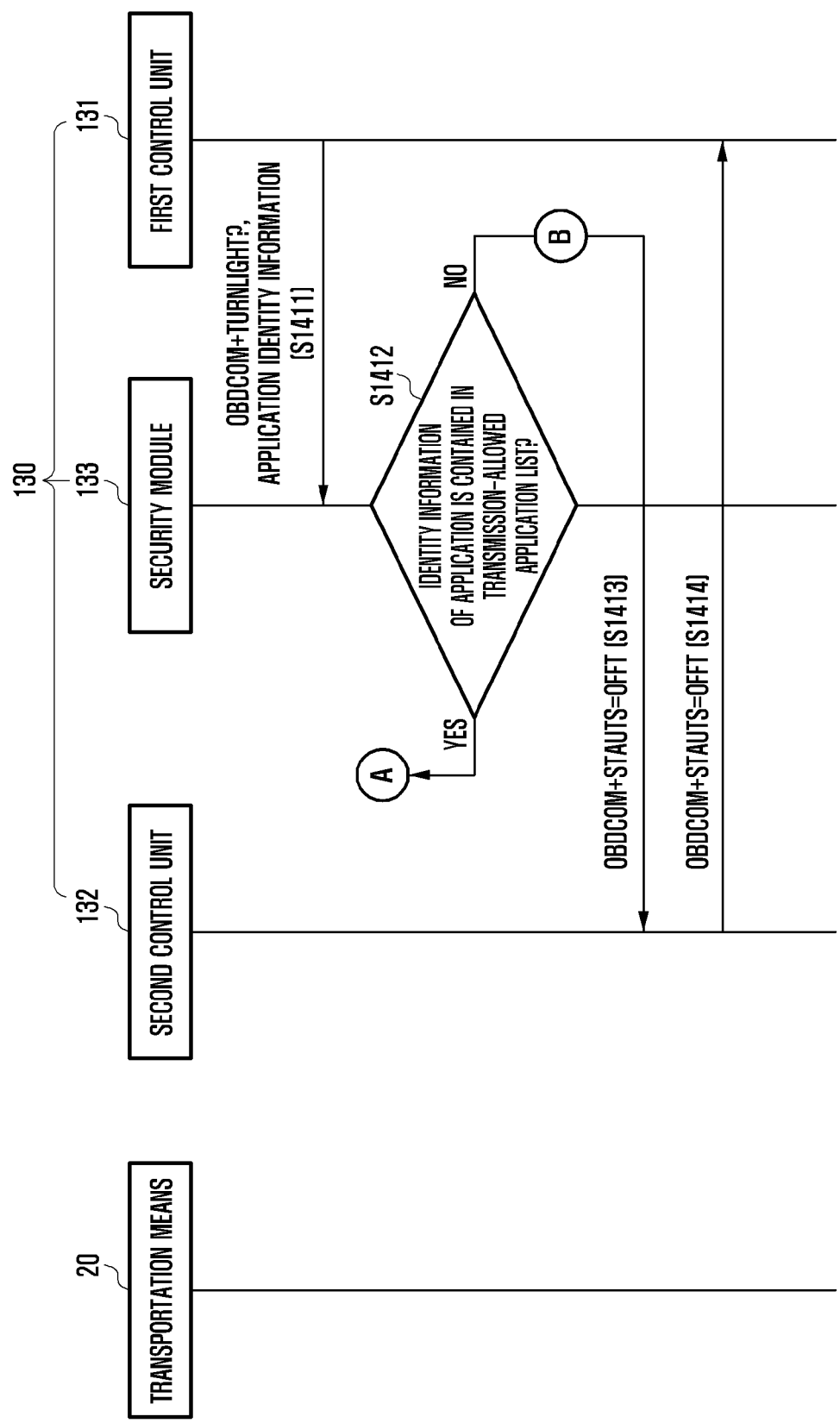

FIGS. 14A to 14C illustrate a procedure for a radio communication terminal to handle command data transmitted to a transportation means.

In reference to FIGS. 14A to 14C, the control unit 130 may include a first control unit 131, a second control unit 132, and a security module 133.

FIG. 14A shows signal flows in a situation where an application of which identity information is contained in the transmission-allowed application list requests for execution of command data. FIGS. 14B and 14C show signal flows in a situation where an application of which identity information is not contained in the transmission-allowed application list requests for execution of command data.

According to an embodiment of the present disclosure, the first control unit 131 may transmit to the security module the command data and identity information of the application that is installed in the mobile terminal 30 and requesting for execution of the command data at step S1401. The examples of the command data have been described in association with step S1301 of FIG. 13A; therefore, a detailed description thereof is omitted herein.

The security module 133 may determine at step S1402 whether the identity information of the application that has requested for execution of the received command data is contained in the transmission-allowed application list.

If it is determined at step S1402 that the identity information of the application is contained in the transmission-allowed application list, the security module 133 may transmit the command data to the second control unit 132 at step S1403. Otherwise, if it is determined at step S1402 that the identity information of the application is not contained in the transmission-allowed application list, the security module 133 may block forwarding the command data to the transportation means 20. The command data blockage operation branched to a step denoted by reference letter "B" is described later with reference to FIGS. 14B and 14C.

If the command data is received, the second control unit 132 may forward the received command data to the transportation means 20 at step S1404.

The transportation means 20 may configure itself based on the received command data at step S1405. The transportation means 20 may transmit a response signal as a pre-configured feedback to the second control unit 132 at step S1406. If the response signal is received, the second control unit 132 may transmit the response signal to the first control unit 131 at step S1407.

According to an embodiment of the present disclosure, the first control unit 131 may transmit, at step S1411, the instruction and the identity information of the application that is installed in the mobile terminal 30 and requesting for execution of the command data to the security module 133. The examples of the command data have been described in association with step S1301 of FIG. 13A; therefore, a detailed description thereof is omitted herein.

If the command data is received, the security module 133 may determine at step S1412 whether the identity information of the application is contained in the transmission-allowed application list.

If it is determined at step S1412 that the identity information of the application is not contained in the transmission-allowed application list, the security module 133 may transmit, at step S1413, the command data blockage information indicating that the command data transmission to the transportation means 20 is blocked. The second control unit 132 may transmit the command data blockage information to the first control unit 131 at step S1414. The examples of the command data blockage information have been described in association with step S1314 of FIG. 13A; therefore, a detailed description thereof is omitted herein.

Otherwise, if it is determined at step S1412 that the identity information of the application is contained in the transmission-allowed application list, the security module 133 may transmit the command data to the second control unit 132. The operation related to this step has been described in association with the reference letter "A" of FIG. 14A; therefore, a detailed description thereof is omitted herein.

According to an embodiment of the present disclosure, the first control unit 131 may transmit the command data to the security module 133 at step S1421. The examples of the command data have been described in association with step S1301 of FIG. 13A; therefore, a detailed description thereof is omitted herein.

If the command data is received, the security module 133 may determine at step S1422 whether the identity information of the application is included in the transmission-allowed application list.

If it is determined at step S1422 that the identity information of the application is not contained in the transmission-allowed application list, the security module 133 may transmit to the first control unit 131 directly the command data blockage information indicating that the command data transmission to the transportation means 20 is blocked without relay by the second control unit 132 at step S1423.

Otherwise, if it is determined at step S1422 that the identity information of the application is contained in the transmission-allowed application list, the security module 133 may transmit the received command data to the second control unit 132. The operation related to this step has been described in association with the reference letter "A" of FIG. 14A; therefore, a detailed description thereof is omitted herein.

Figure 15A:
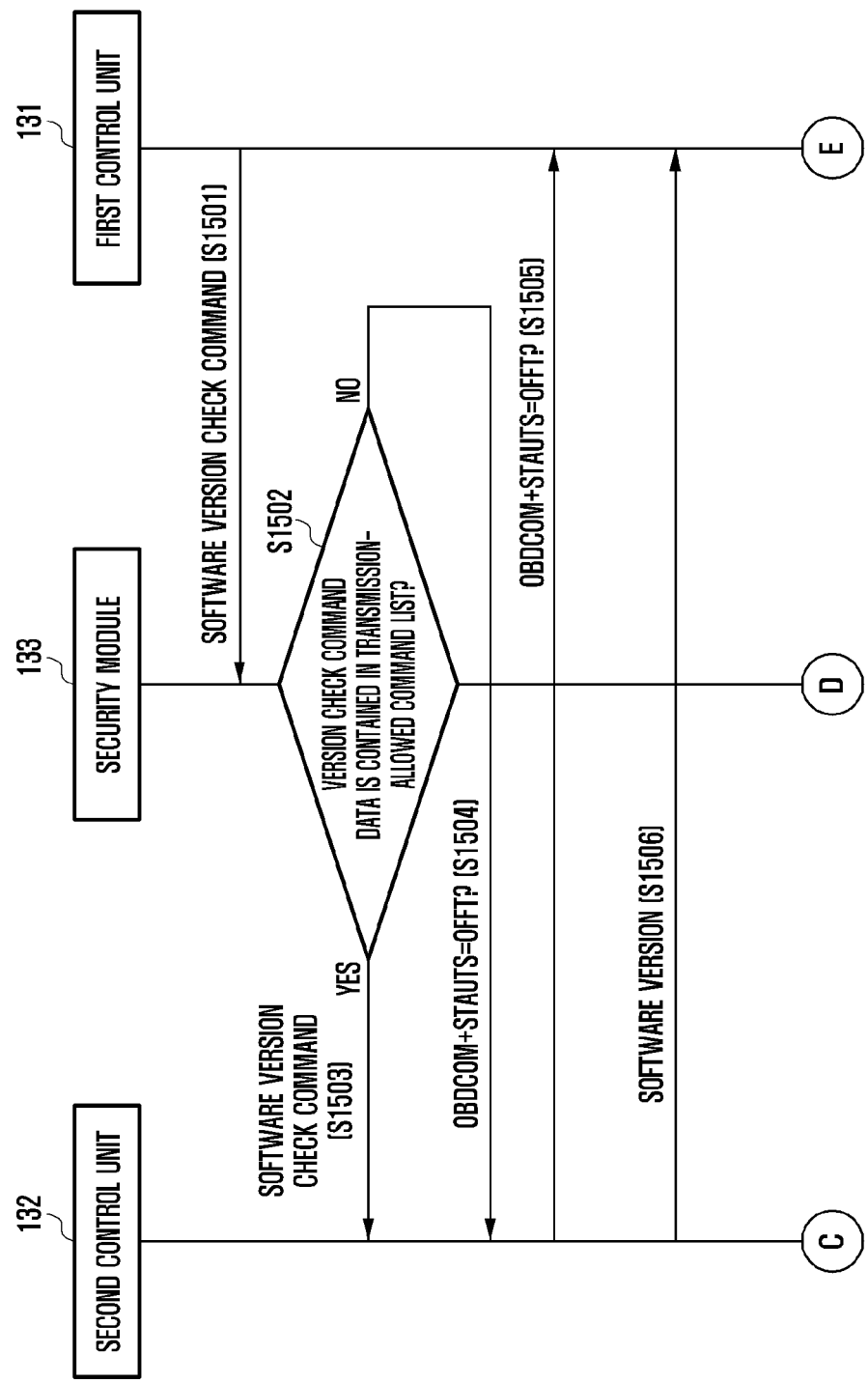
FIGS. 15A to 15C illustrate a software update procedure of a radio communication terminal 10 according to an embodiment of the present disclosure.
Figure 15B:
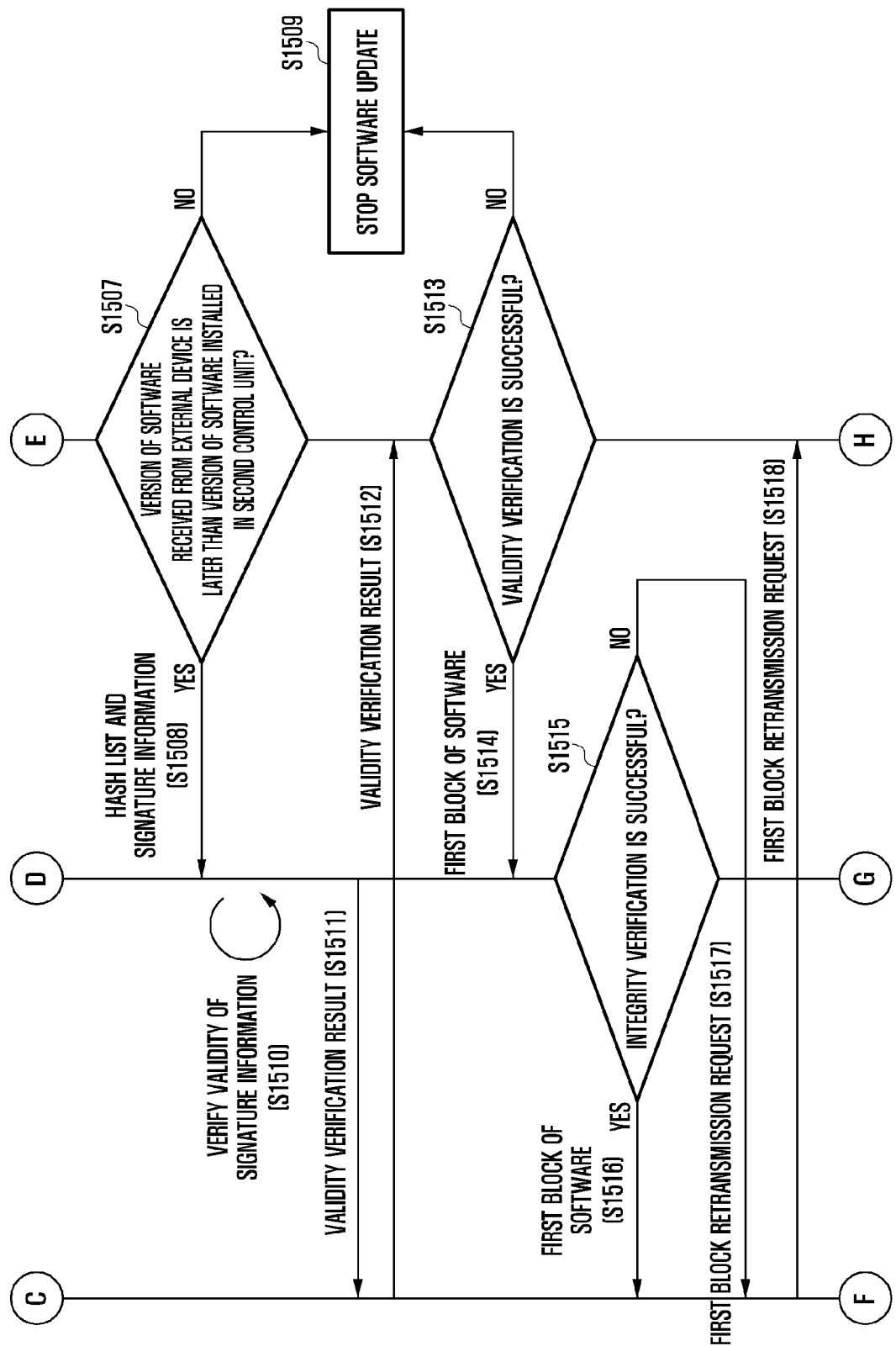
Figure 15C:
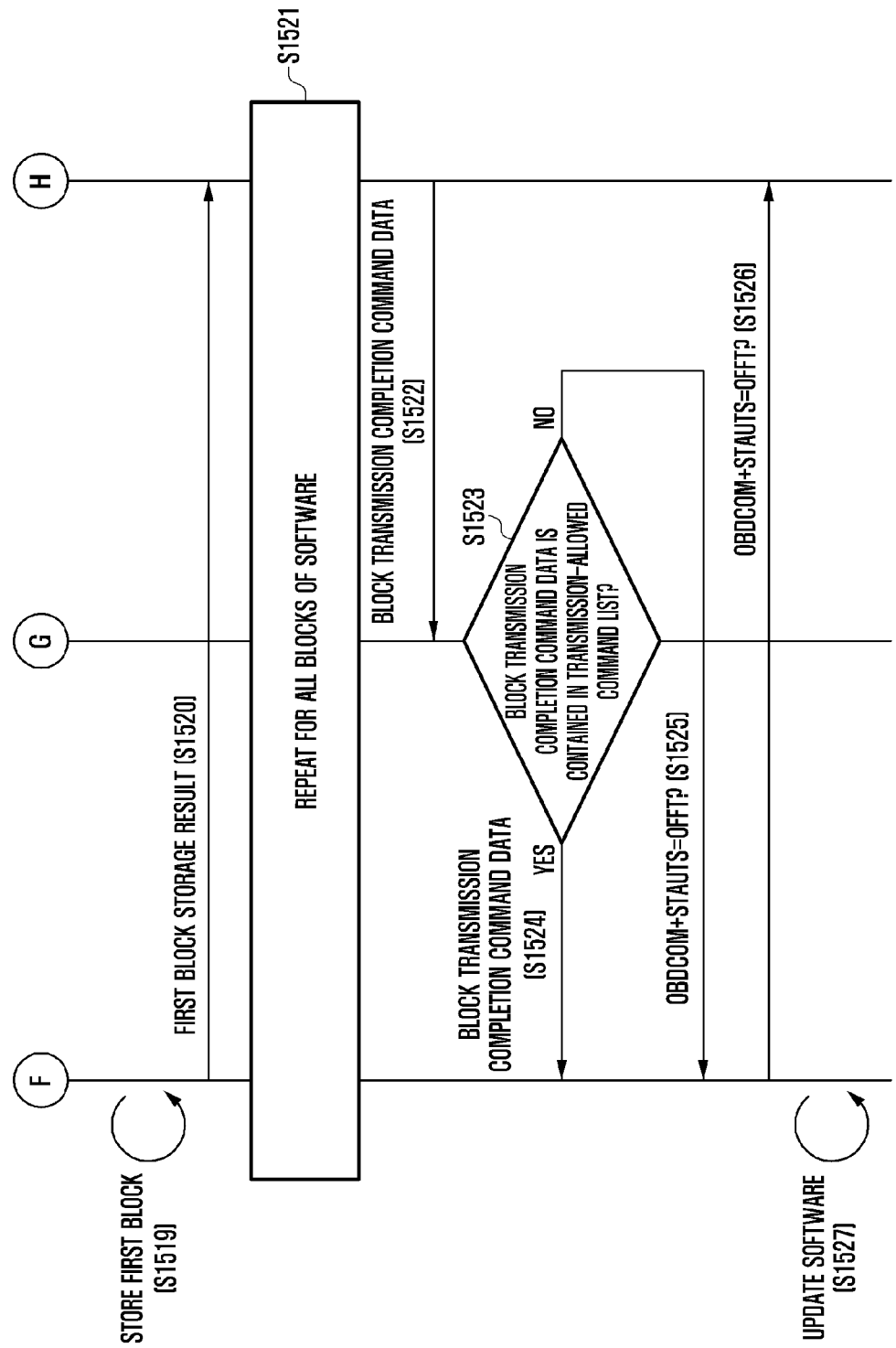

FIGS. 15A to 15C illustrate a software update procedure of a radio communication terminal 10 according to an embodiment of the present disclosure.

The software may be a bootloader image or a firmware image necessary for the operation of the second control unit 132. The software affects the operation of the second control unit; thus, if it is hacked by a third party, the transportation means 20 may be significantly damaged. There is therefore a need of transmitting the software to the second control unit 132 selectively using the security module of the radio communication terminal 10.

In reference to FIGS. 15A to 15C, the first control unit 131 may receive the latest version of the software to be installed in the second control unit 132 from an external device. For example, the first control unit 131 may receive the latest version of the software from a server providing a Firmware Over The Air (FOTA) service. The FOTA service may be a service for updating the software installed in the radio communication terminal 10 with the latest version of the software provided by the server through a wireless network. The server providing the FOTA service may be a manufacturer's server or a management server for the radio communication terminal 10. In this case, the new version of the software may be a part or whole of the latest version of the software or a part different between the old version of the software installed in the radio communication terminal 10 and a new version of the software. Here, the different part of the software may be implemented in the form of a delta file (e.g. delta binary data).

If the latest version of the software is received, the first control unit 131 may transmit to the security module 133, at step S1501, command data instructing the second control unit 132 to check the version of the previously installed software.

If the version check command data is received, the security module 133 may determine at step S1502 whether the version check command data is contained in the transmission-allowed command list.

If it is determined at step S1502 that the version check command data is contained in the transmission-allowed command list, the security module 133 may transmit the version check command data to the second control unit 132 at step S1503. If it is determined at step S1502 that the version check command data is not contained in the transmission-allowed command list, the security module 133 may block forwarding the command data to the transportation means 20. For example, the security module 133 may transmit the command data blockage information to the second control unit 132 at step S1504. The second control unit 132 may transmit the command data blockage information to the first control unit 131 at step S1505. In this case, the security module 133 may directly transmit the command data blockage information to the first control unit 131.

If the version check command data is received, the second control unit 132 may transmit the version information of the software installed in the second control unit 132 to the first control unit 131 at step S1506.

The first control unit 131 may determine at step S1507 whether the version of the software received from the external device is a later version than the version of the software installed previously in the second control unit 132.

If it is determined at step S1507 that the software version received from the external device is later than the software version installed in the second control unit 132, the first control unit 131 may transmit to the security module 133 a hash list and signature information for verifying integrity of data blocks constituting the latest version of the software at step S1508.

If it is determined at step S1507 that the version of the software received from the external device is equal to or earlier than the version of the software previously installed in the second control unit 132, at step S1509 the first control unit 131 may stop updating the software installed in the second control unit 132.

Meanwhile, if the hash list and signature information are received at step S1508, the security module 133 may store the hash list and verify validity of the signature information using a previously stored key at step S1510.

The security module 133 may transmit the signature information validity verification result to the second control unit 132 at step S1511. The second control unit 132 may transmit the validity verification result to the first control unit 131 at step S1512. The security module 133 may transmit the signature information validity verification result to the first control unit 131 directly (not shown).

The first control unit 131 may determine whether the validity verification is successful at step S1513.

If it is determined at step S1513 that the validity verification is successful, the first control unit 131 may transmit the latest version of the software in unit of block at step S1514. For example, the first control unit 131 may transmit to the security module 133 the first block among the blocks constituting the latest version of the software.

Otherwise, if it is determined at step S1513 that the validity verification fails, the first control unit 131 may stop updating the software installed in the second control unit 132.

If the first block is received, the security module 133 may verify integrity of the first block to determine whether the verification is successful at step S1515. For example, the security module 133 may generate a hash value from the first block. The security module 133 may also compare the generated hash value to the hash values contained in a hash list corresponding to the first block to verify the integrity of the first block.

If it is determined at step S1515 that the integrity verification is successful, the security module 133 may transmit the first block to the second control unit 132 at step S1516.

Otherwise, if it is determined at step S1515 that the integrity verification fails, the security module may transmit the first block retransmission request signal to the second control unit 132 at step S1517. The second control unit 132 may transmit the first block retransmission request signal to the first control unit 131 at step S1518. In this case, the security module 133 may transmit the first block retransmission request signal to the first control unit 131 directly (not shown).

If the first block is received, the second control unit 132 may store the first block of the software at step S1519. The second control unit 132 may transmit the storage result of the first block to the first control unit 131 at step S1520.

If the first block storage result is received, the first control unit 131 may transmit the next block to the security module 133 at step S1521. The security module may verify the integrity of the next block and transmit the next block to the second control unit 132 depending on the verification result. The second control unit 132 may store the next block and transmit the next block storage result to the first control unit 131. This process may be repeated for all blocks constituting the latest version of the software to be installed in the second control unit 132.

After transmitting all of the blocks constituting the latest version of the software to the second control unit 132, the first control unit 131 may transmit block transmission completion command data to the security module 133 at step S1522.

If the block transmission completion command data is received, the security module 133 may determine at step S1523 whether the block transmission completion command data is contained in the transmission-allowed command list.

If it is determined at step S1523 that the block transmission completion command data is contained in the transmission-allowed command list, the security module 133 may transmit the block transmission completion command data to the second control unit 132 at step S1524. Otherwise, if it is determined at step S1523 that the block transmission completion command data is not contained in the transmission-allowed command list, the security module 133 may block forwarding the block transmission completion command data to the transportation means 20. For example, the security module may transmit the command data blockage information to the second control unit 132 at step S1525. The second control unit 132 may transmit the command data blockage information to the first control unit 131 at step S1526. In this case, the security module 133 may transmit the command data blockage information to the first control unit 131 directly (not shown).

If the block transmission completion command data is received, the second control unit 132 may update the software installed in the second control unit 132 with the latest version of the software at step S1527.

In FIGS. 15A to 15C, if there is a failure to update the software installed in the second control unit 132 in the software update procedure, the radio communication terminal 10 may transmit the software update failure information to the mobile terminal connected to the radio communication terminal 10.

For example, if there is a mobile terminal 30 in short range communication with the radio communication terminal 10, the radio communication terminal 10 may transmit a cause of software update failure to the mobile terminal in short range communication with the radio communication terminal 10. The software update may fail when the software version received from the server is equal to or earlier than the software version installed in the second control unit 132, when the integrity verification on a block constituting the software fails, and when the validity verification on the signature for installing the latest version of the software fails.

In this case, the mobile terminal 30 may display information on the cause of the software update failure on its screen.

Otherwise, if there is no mobile terminal in short range communication with the radio communication terminal 10, the radio communication terminal 10 may transmit the information on the cause of the software update failure to the external server 40 in long range communication with the radio communication terminal 10. In this case, the external server 40 may search for the mobile terminal 30 that has registered the radio communication terminal 10. If the mobile terminal that has registered the radio communication terminal 10 is found, the external server 40 may transmit the cause of the software update failure to the found mobile terminal 30. In this case, the mobile terminal 30 may display the information on the cause of the software update failure on its screen.

Figure 16:
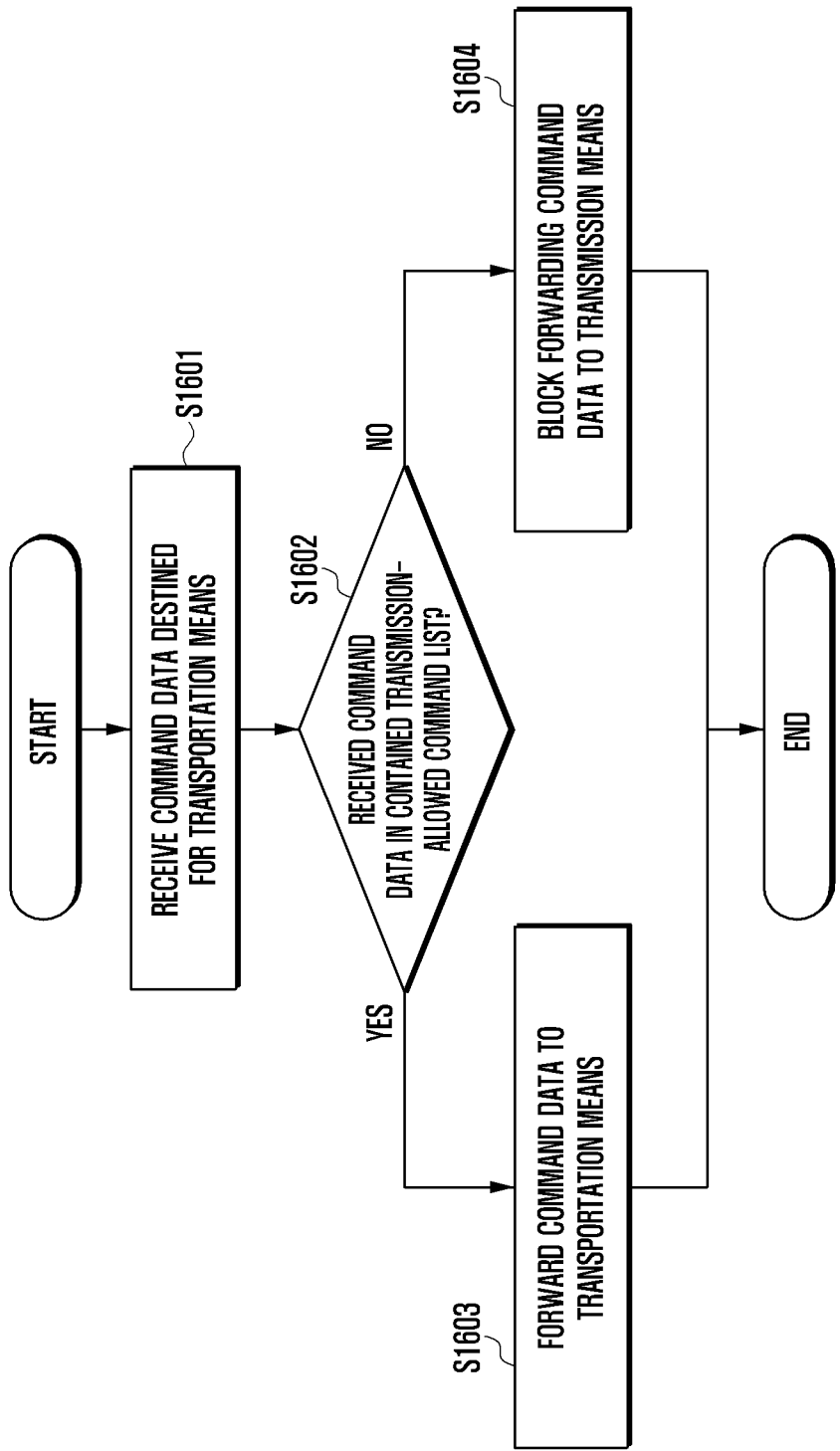
FIG. 16 illustrates a flowchart of a method for processing command data destined for a transportation means according to an embodiment of the present disclosure.

FIG. 16 illustrates a flowchart of a method for processing command data destined for a transportation means according to an embodiment of the present disclosure.

Referring to FIG. 16, the radio communication terminal 10 may receive command data destined for the transportation means 20 from the mobile terminal 30 at step S1601.

The radio communication terminal 10 may determine at step S1602 whether the received command data is contained in the transmission-allowed command list. For example, the transmission-allowed command list may contain inquiry command data or control command data guaranteeing the user's safety as described with reference to FIG. 2C.

If it is determined at step S1602 that the received command data is contained in the transmission-allowed command list, the radio communication terminal 10 may forward the command data to the transportation means 20 at step S1603.

Otherwise, if it is determined at step S1602 that the received command data is not contained in the transmission-allowed command list, the radio communication terminal 10 may block forwarding the command data to the transportation means 20 at step S1604.

If forwarding the command data to the transportation means 20 is blocked, the radio communication terminal 10 may transmit at least one of the blocked command data information and the cause of the command data blockage to the mobile terminal.

Figure 17:
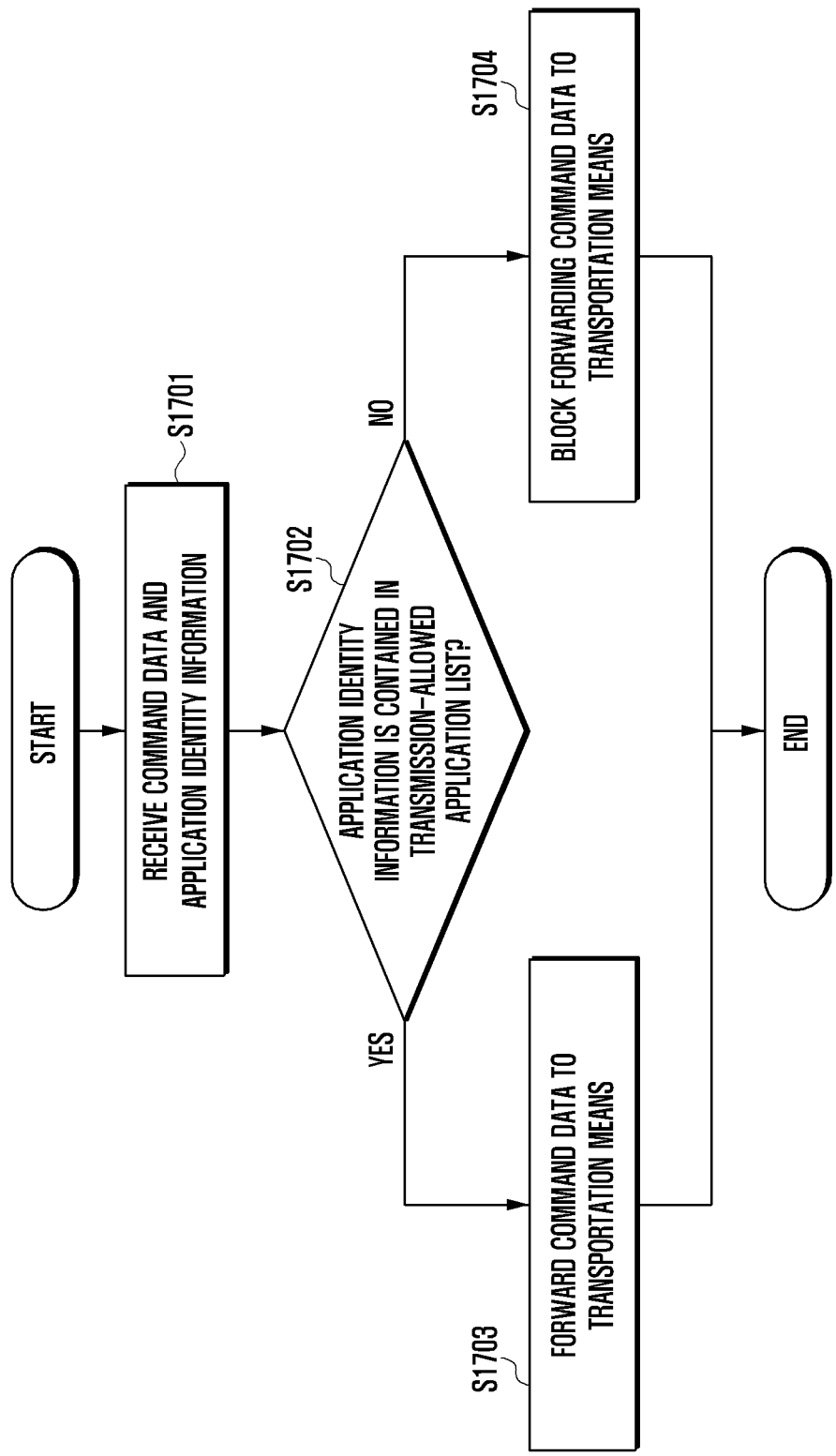
FIG. 17 illustrates a flowchart of a method for processing command data destined for a transportation means according to another embodiment of the present disclosure.

FIG. 17 illustrates a flowchart of a method for processing command data destined for a transportation means according to another embodiment of the present disclosure.

In reference to FIG. 17, the radio communication terminal 10 may receive command data destined for the transportation means 20 and identity information of an application requesting for execution of the command data from the mobile terminal 30 at step S1701.

The radio communication terminal 10 may determine at step S1702 whether the identity information of the application is contained in the transmission-allowed application list.

If it is determined at step S1702 that the received identity information is contained in the transmission-allowed application list, the radio communication terminal 10 may forward the command data to the transportation means 20 at step S1703.

Otherwise, if it is determined at step S1702 that the received identity information is not contained in the transmission-allowed application list, the radio communication terminal 10 may block forwarding the command data to the transportation means 20 at step S1704.

If forwarding the command data to the transportation means 20 is blocked at step S1704, the radio communication terminal 10 may transmit at least one of the block command data information and the identity information of the application that has requested for executing the command data.

According to various embodiments of the present disclosure, the devices (e.g., modules, radio communication terminal 10, and mobile terminal 30) and methods (e.g., operations) may be executed by at least one processor (e.g., control unit 130) that is capable of executing instructions included in at least one of programs stored in a computer-readable storage medium.

In the case that an instruction is executable by the processor (e.g., control unit 130), the at least one processor may execute a function corresponding to the instruction. At this time, the computer-readable storage medium may be the storage unit 120.

As described above, the instruction processing method of the present disclosure is advantageous in terms of securing the safety of the passengers in the transportation means by preventing a third party from controlling the transportation means remotely.

Also, the instruction processing method of the present disclosure is advantageous in terms of protecting the transportation means and items in the transportation means against theft by preventing a third party from controlling the transportation means illegally.

Also, the instruction processing method of the present disclosure is advantageous in terms of protecting the driver of a transportation means against the threat of remote control by a third party by enhancing the transportation means control command data verification process with a security module mounted to the wireless terminal.

Also, the instruction processing method of the present disclosure is advantageous in terms of preventing a third party from controlling a transportation means through illegal access to a terminal wirelessly connected to the transportation means by enhancing the software update verification process of the wireless terminal with a security module.

The programs may be stored in a computer-readable storage medium such as a hard disc, a floppy disk, magnetic media (e.g., magnetic tape), optical media (e.g., Compact Disc Read Only Memory (CD-ROM) and Digital Versatile Disc (DVD)), magneto-optical media (e.g., floptical disk), and a hardware device (e.g., Read Only Memory (ROM), a Random Access Memory (RAM), and flash memory). Although it is typical that a storage medium is included as an internal component of the radio communication terminal 10, the storage medium may be connected to a port of the radio communication terminal 10 or included in a mobile terminal (e.g., cloud device, a server, and another type of electronic device) located outside the radio communication terminal. The programs may be stored in a plurality of storage media and, in this case, part of the storage media may be included in the mobile terminal connected to the radio communication terminal 10.

The program commands include language code executable by computers using an interpreter as well as machine language codes created by a compiler. The aforementioned hardware device can be implemented with one or more software modules for executing the operations of the various exemplary embodiments of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A command data processing method of a radio communication terminal configured to communicate with a transportation means and a mobile terminal, the method comprising:
   receiving command data destined for the transportation means from the mobile terminal;
   checking an operation status of the transportation means;
   determining whether to deliver the command data to the transportation means based on the operation status of the transportation means, a type of the command data, and information on the command data; and
   delivering, when the command data is determined to be delivered to the transportation means, the command data to the transportation means.

2. The method of claim 1, further comprising blocking, when the command data is determined not to be delivered to the transportation means, delivery of the command data to the transportation means.

3. The method of claim 1, wherein the command data is received from the mobile terminal using a wireless communication protocol and transmitted to the transportation means using a wired communication protocol.

4. The method of claim 1, wherein whether to deliver the command data to the transportation means is determined based on a communication protocol used for receiving the command data.

5. The method of claim 4, wherein determining whether to deliver the command data to the transportation means comprises:
   determining, when the command data is received using a short range communication protocol, to deliver the command data to the transportation means; and
   determining, when the command data is received using a long range communication protocol, to block delivery of the command data to the transportation means.

6. The method of claim 1, wherein determining whether to deliver the command data to the transportation means comprises:
   determining, when the type of the command data is an inquiry command data for inquiring about the operation status of the transportation means, to deliver the command data to the transportation means; and
   determining, when the type of the command data is a control command data for controlling the transportation means, not to deliver the command data to the transportation means.

7. The method of claim 1, wherein whether to deliver the command data to the transportation means is determined based on an operation mode of the mobile terminal transmitting the command data.

8. The method of claim 1, wherein whether to deliver the command data to the transportation means is determined based on whether an identity information of the mobile terminal transmitting the command data is previously registered with the radio communication terminal.

9. A command data processing method of a radio communication terminal configured to communicate with a transportation means and a mobile terminal, the method comprising:
   receiving command data destined for the transportation means from the mobile terminal;
   delivering, when the command data is contained in a transmission-allowed command list and when the command data is a certain type of command data, the command data to the transportation means; and
   blocking, when the received command data is not contained in the transmission-allowed command list, delivery of the command data to the transportation means.

10. The method of claim 9, further comprising transmitting at least one of blocked command data information and a cause of command data blockage.

11. A command data processing method of a radio communication terminal configured to communicate with a transportation means and a mobile terminal, the method comprising:
   receiving command data destined for the transportation means and identity information of an application requesting for execution of the command data from the mobile terminal;
   delivering, when the identity information of the application is contained in a transmission-allowed application list and when the command data is a certain type of command data, the command data to the transportation means; and
   blocking, when the identity information of the application is not contained in the transmission-allowed application list, delivery of the command data to the transportation means.

12. A radio communication terminal configured to communicate with a transportation means and a mobile terminal, the radio communication terminal comprising:
   a communication unit configured to receive command data destined for the transportation means from the mobile terminal; and a control unit configured to:
  check an operation status of the transportation means;
  determine whether to deliver the command data to the transportation means based on the operation status of the transportation means, a type of command data, and information on the command data; and
  control, when the command data is determined to be delivered to the transportation means, the communication unit to transmit the command data to the transportation means.

13. The radio communication terminal of claim 12, wherein the control unit comprises:
  a first control unit configured to determine whether to deliver the command data; and
  a second control unit configured to convert the command data to a format recognizable by the transportation means.

14. The radio communication terminal of claim 13, wherein the first control unit is configured to block, when the command data is determined not to be delivered to the transportation means, transmitting the command data to the second control unit.

15. The radio communication terminal of claim 12, wherein the communication unit comprises:
  a first communication unit configured to receive the command data destined for the transportation means from the mobile terminal using a wireless communication protocol; and
  a second communication unit configured to transmit the command data to the transportation means using a wired communication protocol.

16. The radio communication terminal of claim 12, wherein the control unit is configured to determine whether to deliver the command data to the transportation means based on a communication protocol used for receiving the command data.

17. The radio communication terminal of claim 12, wherein the control unit is configured to determine to:
  deliver, when the command data is received using a short range communication protocol, the command data to the transportation means; and
  block, when the command data is received using a long range communication protocol, delivery of the command data to the transportation means.

18. The radio communication terminal of claim 12, wherein the control unit is configured to determine to:
  deliver, when the type of the command data is an inquiry command data for inquiring about the operation status of the transportation means, the command data to the transportation means; and
  block, when the type of the command data is a control command data for controlling the transportation means, delivery of the command data to the transportation means.

19. The radio communication terminal of claim 12, wherein the control unit is configured to determine whether to deliver the command data to the transportation means based on an operation mode of the mobile terminal transmitting the command data.

20. The radio communication terminal of claim 12, wherein the control unit is configured to determine whether to deliver the command data to the transportation means based on whether an identity information of the mobile terminal is registered with the radio communication terminal.

21. A radio communication terminal configured to communicate with a transportation means and a mobile terminal, the radio communication terminal comprising:
  a communication unit configured to receive command data destined for the transportation means from the mobile terminal;
  a first control unit configured to transmit the command data to a security module;
  a second control unit configured to receive the command data from the first control unit and transmit the command data to the radio communication terminal; and
  a security module configured to:
    transmit, when the command data is contained in a transmission-allowed command list and when the command data is a certain type of command data, the command data to the second control unit; and
    block, when the command data is not contained in the transmission-allowed command list, transmission of the command data to the second control unit.

22. The radio communication terminal of claim 21, wherein the communication unit is configured to transmit at least one of blocked command data information and a cause of command data blockage to the mobile terminal.

23. A radio communication terminal configured to communicate with a transportation means and a mobile terminal, the radio communication terminal comprising:
  a communication unit configured to receive command data destined for the transportation means and identity information of an application requesting for execution of the command data from the mobile terminal;
  a first communication unit configured to transmit the command data and the identity information of the application requesting execution of the command data;
  a second communication unit configured to:
    receive the command data from the first communication unit; and
    transmit the command data to the transportation means; and
  a security module configured to:
    transmit, when the identity information of the application is contained in a transmission-allowed application list and when the command data is a certain type of command data, the command data to the second communication unit; and
    block, when the identity information of the application is not contained in the transmission-allowed application list, delivery of the command data to the transportation means.

* * * * *